(12) United States Patent
Fuller

(10) Patent No.: US 12,430,839 B2
(45) Date of Patent: Sep. 30, 2025

(54) TEMPORAL AND SPATIAL COHERENCE IN RAY TRACING

(71) Applicant: Microsoft Technology Licensing, LLC, Redmond, WA (US)

(72) Inventor: Martin Jon Irwin Fuller, Gaydon (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 18/083,390

(22) Filed: Dec. 16, 2022

(65) Prior Publication Data

US 2024/0135628 A1    Apr. 25, 2024

Related U.S. Application Data

(60) Provisional application No. 63/418,299, filed on Oct. 21, 2022.

(51) Int. Cl.
G06T 15/06 (2011.01)

(52) U.S. Cl.
CPC .................... G06T 15/06 (2013.01)

(58) Field of Classification Search
CPC ..................................... G06T 15/06
See application file for complete search history.

(56) References Cited

U.S. PATENT DOCUMENTS

| | | | | |
|---|---|---|---|---|
| 11,373,358 B2 * | 6/2022 | Muthler | ................. | G06F 9/5027 |
| 11,922,556 B2 * | 3/2024 | Panteleev | ............. | G06T 15/506 |
| 2020/0035014 A1 * | 1/2020 | Pantaleoni | ............. | G06T 15/06 |
| 2020/0327717 A1 * | 10/2020 | Yoon | ..................... | G06T 15/005 |
| 2022/0044467 A1 * | 2/2022 | Woop | ........................ | G06T 1/20 |
| 2022/0327762 A1 * | 10/2022 | Panteleev | ............. | G06T 15/506 |
| 2023/0196654 A1 * | 6/2023 | Nowicki | ................... | G06T 1/20 |
| | | | | 345/426 |
| 2024/0112392 A1 * | 4/2024 | Pankratz | ................. | G06T 15/06 |
| 2024/0135628 A1 * | 4/2024 | Fuller | .................... | G06T 15/06 |

OTHER PUBLICATIONS

Martin et al., Temporally Coherent Interactive Ray Tracing, 2002 (Year: 2002).*
Groller et al., Using temporal and spatial coherence for accelerating the calculation of animation sequences, 1991 (Year: 1991).*
Havran et al., Exploiting Temporal Coherence in Ray Casted Walkthroughs, 2003 (Year: 2003).*

(Continued)

*Primary Examiner* — Phong X Nguyen
(74) *Attorney, Agent, or Firm* — WORKMAN NYDEGGER

(57) ABSTRACT

A ray trace operation includes tracing a ray from an origin point in accordance with a ray path into a virtual environment (where the virtual environment comprises one or more virtual objects defined by one or more object components) and determining an intersected object component of the one or more object components that the ray intersects with. Determining the intersected object component comprises accessing (i) ray trace temporal coherence data based upon a preceding ray trace operation that temporally precedes the ray trace operation or (ii) ray trace spatial coherence data based upon a spatially proximate ray trace operation.

9 Claims, 26 Drawing Sheets

(56) References Cited

OTHER PUBLICATIONS

U.S. Appl. No. 63/418,299, filed Oct. 21, 2022.
Groller, et al., "Using temporal and spatial coherence for accelerating the calculation of animation sequences," Technische Universitat Wien, Sep. 1991, vol. 12, Sep. 2, 1991, pp. 103-113.
Havran, et al., "LCTS: Ray Shooting using Longest Common Traversal Sequences," Computer Graphics Forum, vol. 19, Issue No. 3, Dec. 24, 2001, pp. 59-70.
Hendrich, et al., "Ray Classification for Accelerated BVH Traversal", Computer Graphics Forum, Wiley, vol. 38, Issue No. 4, Jul. 30, 2019, pp. 49-56.
International Search Report and Written Opinion received for PCT Application No. PCT/US23/033332, Feb. 23, 2024, 16 pages.
MacDonald, et al., "Heuristics for ray tracing using space subdivision," Visual Computer, Springer, vol. 6, Issue No. 3, May 1990, pp. 153-166.
International Preliminary Report On Patentability received for PCT Application No. PCT/US23/033332, May 1, 2025, 13 pages.

* cited by examiner

TEMPORAL AND SPATIAL COHERENCE IN RAY TRACING

CROSS-REFERENCE TO RELATED APPLICATIONS

This application claims priority to U.S. Provisional Patent Application Ser. No. 63/418,299, filed Oct. 21, 2022, and entitled "TEMPORAL AND SPATIAL COHERENCE IN RAY TRACING", the entirety of which is incorporated herein by this reference.

BACKGROUND

Ray tracing is a technique for generating visible imagery reconstructed in a 3D computer graphics environment. In some instances, ray tracing involves tracing a path from a virtual camera or viewing position through each pixel in a virtual image plane. The rays extend into a virtual scene to intersect with virtual content that can be represented by the pixels. Visual properties of the intersected virtual content to be represented by the pixels can then be determined (which can involve determining virtual object/material properties and/or tracing additional rays from the intersected virtual content). Ray tracing can be used to simulate a variety of optical effects, such as reflection, refraction, shadows, scattering, and/or others.

Ray tracing is generally associated with high computational cost and has typically been used in implementations where long rendering times are feasible, such as for generating still computer-generated images or cinematic visual effects. In real-time applications, such as computer graphics for video games or other implementations where rendering speed affects user experience, utilizing ray tracing is associated with many challenges.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
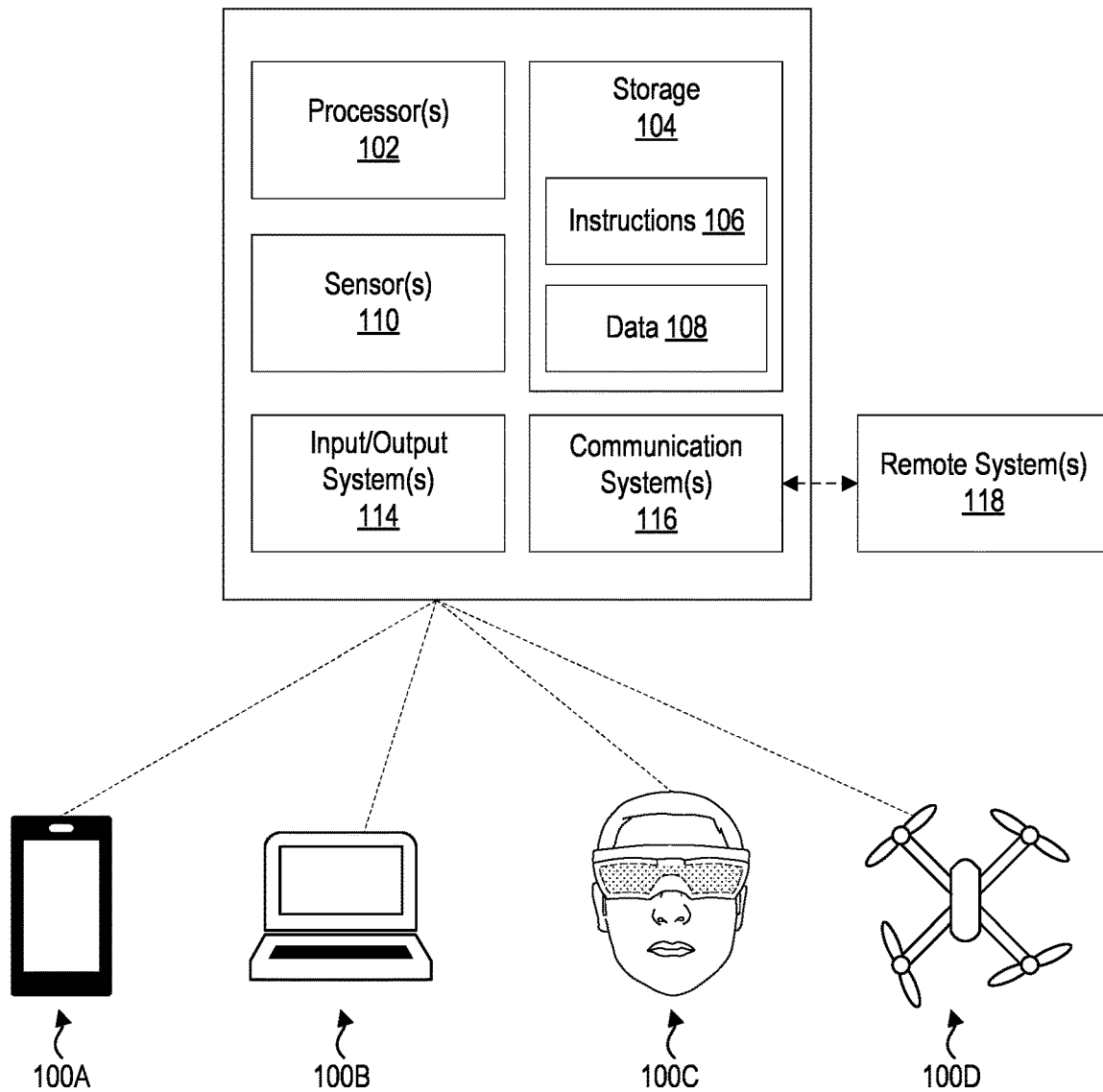
FIG. 1 illustrates example components of an example system that may include or be used to implement one or more disclosed embodiments.

Disclosed embodiments are generally directed to systems, methods, and apparatuses for performing ray trace operations that utilize ray trace temporal and/or spatial coherence data.

As noted above, implementing ray tracing in real-time computer graphics applications is associated with many challenges, in particular because of the computational burden associated with conventional ray tracing techniques. Attempts to adapt ray tracing techniques for real-time applications include utilizing an acceleration structure, which partitions the object components (e.g., mesh triangles, quads, curved surfaces, distance fields, high-level representations, and/or others) of virtual objects in a virtual environment into a structure of nodes. For instance, nodes of an acceleration structure may include either a number of child nodes (e.g., 2, 4, 8, 16, or any number of child nodes) or a set of object components of virtual objects in the virtual environment (e.g., for nodes in the final layer of the acceleration structure).

Implementing an acceleration structure can allow systems to refrain from testing whether each ray intersects with every object component within a virtual environment to determine the intersected object component for each ray. Instead, a system may traverse the acceleration structure for each ray by, for each ray, determining which top-layer (or starting layer) node the ray intersects with, determining which child node of the intersected top-layer node the ray intersects with, and so forth (e.g., continuing to test/traverse branches of nodes) until a set of object components is reached in association with an intersected child node in the final layer of the acceleration structure. The ray may then be tested against the set of object components to determine which object component the ray intersects with.

Although conventional acceleration structure techniques can facilitate some reduction in the computational cost associated with ray tracing, acceleration structure based ray tracing falls short in many use cases (e.g., resulting in high latency that degrades user experiences).

At least some implementations of the present disclosure involve leveraging the outcomes of preceding ray trace operations to facilitate improved computational efficiency for ray tracing. For example, ray trace temporal coherence data associated with a preceding ray trace operation may be used in a subsequent ray trace operation. Ray trace temporal coherence data may take on various forms, such as a preceding intersected object component (e.g., the object component intersected by the preceding ray of the preceding ray trace operation), a set of neighboring object components that includes the preceding intersected object component, a node (or multiple nodes) of an acceleration structure that encompasses the preceding intersected object component, an entire virtual object that includes the preceding intersected object component, and/or others.

Ray trace temporal coherence data may be selected based upon motion vectors of virtual objects in the virtual environment and/or movement of the virtual camera or viewpoint within the virtual environment. Additional details related to ray trace temporal coherence data will be provided hereinbelow.

Utilizing ray trace temporal coherence data to perform ray tracing may facilitate a reduction in the search space for determining the object component intersected by a current ray in a current ray trace operation. For instance, rather than testing a current ray against an entire acceleration structure of a virtual environment or scene, a system may initially test a previously intersected object component (and/or set of object components, set of nodes of an acceleration structure, etc.) to determine whether the current ray also intersects with any such object components. If successful, a system may advantageously circumvent a significant quantity of acceleration structure traversal computation, thereby improving computational efficiency.

If leveraging temporal coherence data is unsuccessful, a system may revert to testing the remainder of the acceleration structure to determine the intersected object component for the current ray.

At least some implementations of the present disclosure involve leveraging the outcomes of contemporary ray trace operations (e.g., ray trace operations associated with generating the same image frame) to facilitate improved computational efficiency for ray tracing.

For example, ray trace spatial coherence data associated with a first ray trace operation may be used in a second ray trace operation (where both the first and second ray trace operations are associated with generating the same timepoint or image frame/instance). Ray trace spatial coherence data may take on various forms, such as a first intersected object component associated with the first ray trace operation, a set of neighboring object components that includes the first intersected object component, a node (or multiple nodes) of an acceleration structure that encompasses the first intersected object component, an entire virtual object that includes the first intersected object component, and/or others.

Utilizing ray trace spatial coherence data to perform the second ray trace operation may facilitate a reduction in the search space for determining the second object component intersected by the second ray in the second ray trace operation. For instance, rather than testing the second ray against an entire acceleration structure of a virtual environment or scene, a system may initially test the first intersected object component (and/or set of object components, set of nodes of an acceleration structure, etc.) to determine whether the second ray also intersects with any such object components. If successful, a system may advantageously circumvent a significant quantity of acceleration structure traversal computation, thereby improving computational efficiency.

If leveraging spatial coherence data is unsuccessful, a system may revert to testing the remainder of the acceleration structure to determine the second intersected object component for the second ray.

In some implementations, spatial coherence data and temporal coherence data are utilized in conjunction with one another to facilitate further improvement to ray tracing computational efficiency. For instance, a first set of ray trace operations may be performed to generate a frame, and any number of the first ray trace operations of the first set may utilize temporal coherence data (if available). A second set of ray trace operations for generating the same frame may then be performed, and one or more outcomes of the first set of ray trace operations may give rise to spatial coherence data that can be used for performing the second set of ray trace operations (temporal coherence data may additionally or alternatively be utilized, if available).

Figure 6:
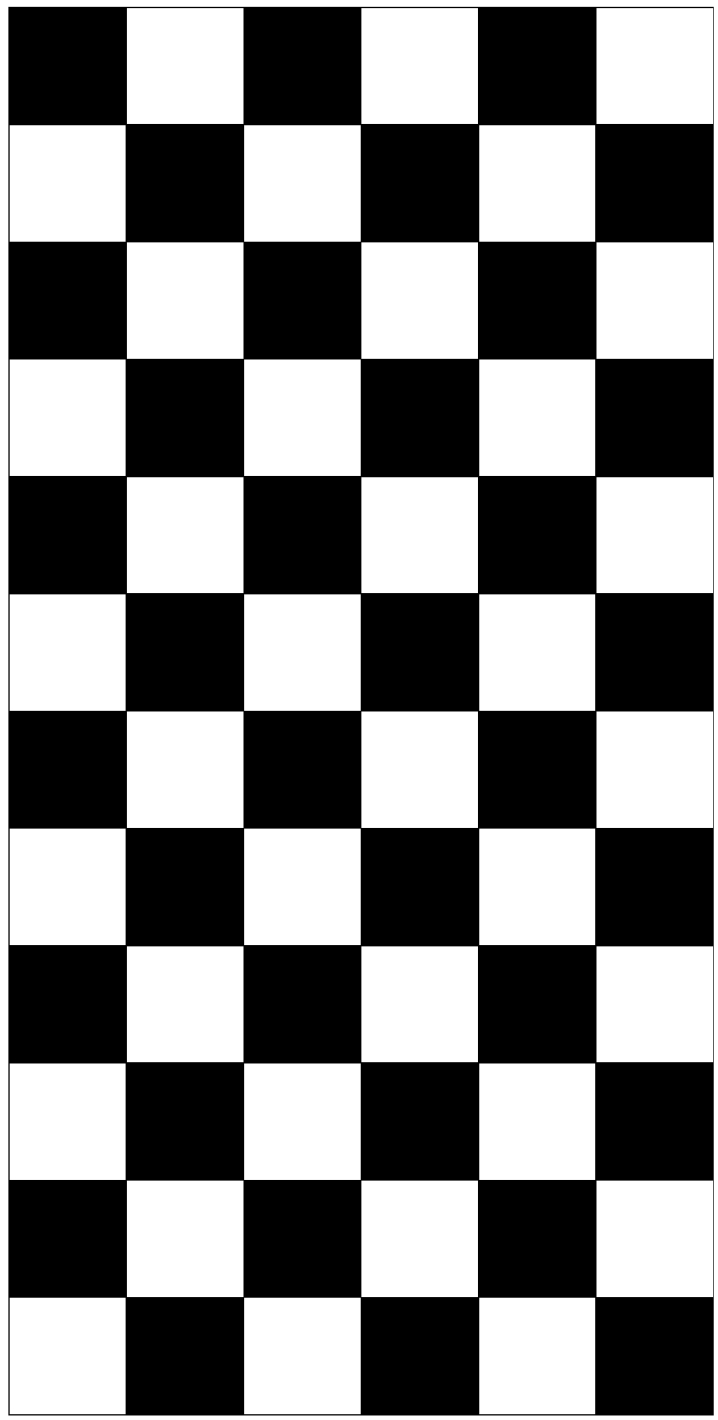
FIG. 6 illustrates a conceptual representation of a ray trace scheme that utilizes ray trace temporal coherence data and/or ray trace spatial coherence data.

In some instances, determining that a ray intersects with an object component based upon ray trace temporal coherence data and/or ray trace spatial coherence data allows a system to entirely terminate further searching for other (e.g., closer) object components that the ray intersects with (e.g., in case of determining shadow effects; or when sufficient spatial consensus exists on the object component(s) the ray intersects with, which may be achieved, for example, utilizing techniques discussed herein with reference to FIG. 6).

Having just described some of the various high-level features and benefits associated with the disclosed embodiments, attention will now be directed to FIGS. 1 through 8. These Figures illustrate various conceptual representations, architectures, methods, and supporting illustrations related to the disclosed embodiments.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with ray tracing. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. A system 100 may take on other forms in accordance with the present disclosure.

Ray Tracing Using Temporal Coherence Data

Figure 2A:
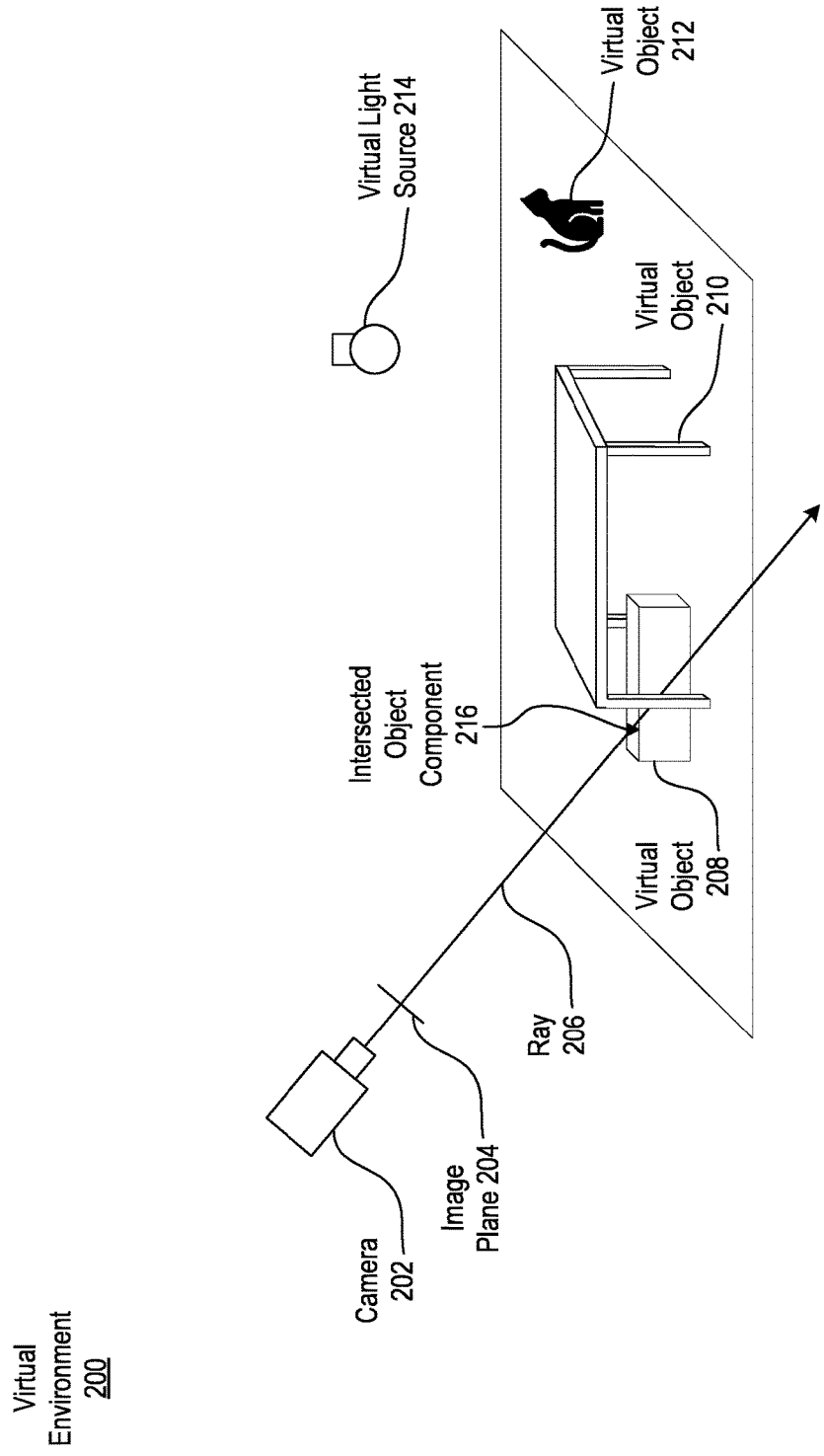
FIG. 2A illustrates a conceptual representation of an example virtual environment in which a ray trace operation is performed.

FIG. 2A illustrates a conceptual representation of an example virtual environment 200 in which a ray trace operation is performed. The virtual environment 200 includes various virtual objects, such as virtual object 208 (e.g., a box), virtual object 210 (e.g., a table), virtual object 212 (e.g., a cat), virtual light source 214, etc. The virtual objects within the virtual environment may include or be represented by respective object components, which may take on various forms (e.g., mesh triangles, quads, curved surfaces, distance fields, high-level representations, and/or others).

FIG. 2A illustrates a camera 202 positioned within the virtual environment 200, which can represent a view frustrum associated with a user experience. One or more ray trace operations may be performed to determine portions of the virtual environment 200 that are visible from the perspective of the camera 202. As depicted in FIG. 2A, a ray trace operation may include tracing a ray 206 from an origin point (e.g., the camera 202) through a pixel of an image plane 204 and into the virtual environment 200. The pixels of the image plane 204 can correspond to display pixels that will be presented to a user to depict the virtual environment 200 to the user. The ray 206 may thus be used to determine what portion of the virtual environment 200 to display on a corresponding display pixel (e.g., on a frame-by-frame basis).

For instance, FIG. 2A illustrates an intersected object component 216 (e.g., a mesh triangle) of the virtual object 208 that the ray 206 intersects with. A display pixel corresponding to the pixel on the image plane 204 through which the ray 206 was traced may thus be configured/controlled to depict/represent the intersected object component 216 of the virtual object 208 (e.g., for a particular frame). Properties of the virtual object 208 may be accessed and/or determined (which may include additional ray trace operations, see FIGS. 3A through 3C) to facilitate realistic representation of the intersected object component 216 with the corresponding display pixel.

The intersected object component 216 that the ray 206 intersects with can be determined utilizing conventional ray tracing techniques (e.g., utilizing one or more acceleration structures associated with the virtual environment 200).

However, as noted above, conventional ray tracing techniques are associated with computational inefficiency. As will be described hereinbelow, ray trace temporal coherence data may be leveraged to improve computational efficiency associated with ray tracing.

Figure 2B:
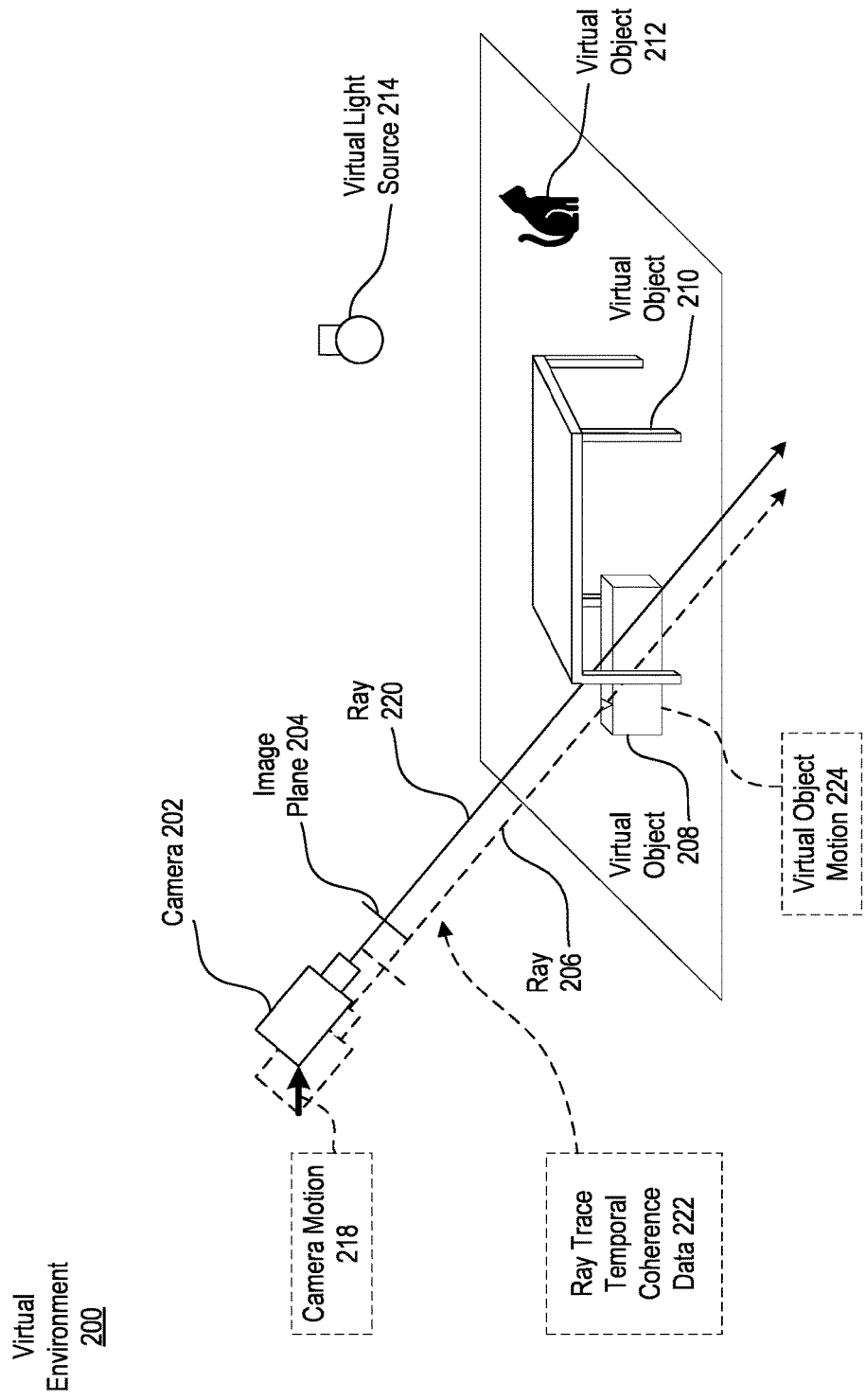
FIG. 2B illustrates a conceptual representation of an example ray trace operation that is temporally subsequent to the ray trace operation of FIG. 2A.

FIG. 2B depicts the virtual environment 200 of FIG. 2A, but at a subsequent timepoint (e.g., at a subsequent frame). For instance, FIG. 2B illustrates that the camera 202 and the image plane 204 have moved or changed positions, with the preceding positions of the camera 202 and image plane 204 (and the previous ray 206) being shown in broken lines. FIG. 2B illustrates another ray 220 traced from an origin point at the camera 202 through the image plane 204 (e.g., through the same pixel that ray 206 was traced through) and into the virtual environment 200.

As indicated above, the ray 220 is temporally subsequent to the ray 206. Information from the ray trace operation associated with the ray 206 (e.g., for the preceding frame) may be leveraged to facilitate efficient determination of the object component(s) that the ray 220 intersects with (e.g., for the current frame). FIG. 2B conceptually depicts information from a (preceding) ray trace operation associated with the ray 206 as ray trace temporal coherence data 222.

Ray trace temporal coherence data 222 may take on various forms and/or may be leveraged in various ways. Example implementations of ray trace temporal coherence data 222 will be provided below with reference to FIGS. 2C through 2F. Although these examples focus, in at least some respects, on utilizing ray trace temporal coherence data 222 associated with a single preceding ray (e.g., ray 206) traced through the same pixel of the image plane 204 as a current ray (e.g., ray 220), ray trace temporal coherence data 222 used for a current ray trace operation may include information associated with one or more additional (or alternative) rays traced through one or more different pixels of the image plane 204. For example, ray trace temporal coherence data 222 for use with a current ray trace operation may be selected based upon camera motion 218, motion virtual object motion 224 (e.g., represented by motion vectors associated with virtual objects within the virtual environment 200), and/or other factors. Furthermore, although some examples herein focus on ray trace operations associated with a view frustrum, the principles discussed herein related to implementation of ray trace temporal coherence data may be utilized in other contexts (e.g., for rays traced from origin points associated with object components in the environment to determine shadow, reflection, and/or other properties/effects). Still furthermore, although at least some examples herein focus on ray tracing for determining visible object components and/or visual characteristics for object components, the principles discussed herein may be applied for other purposes (e.g., to determine sound propagation).

Figure 2C:
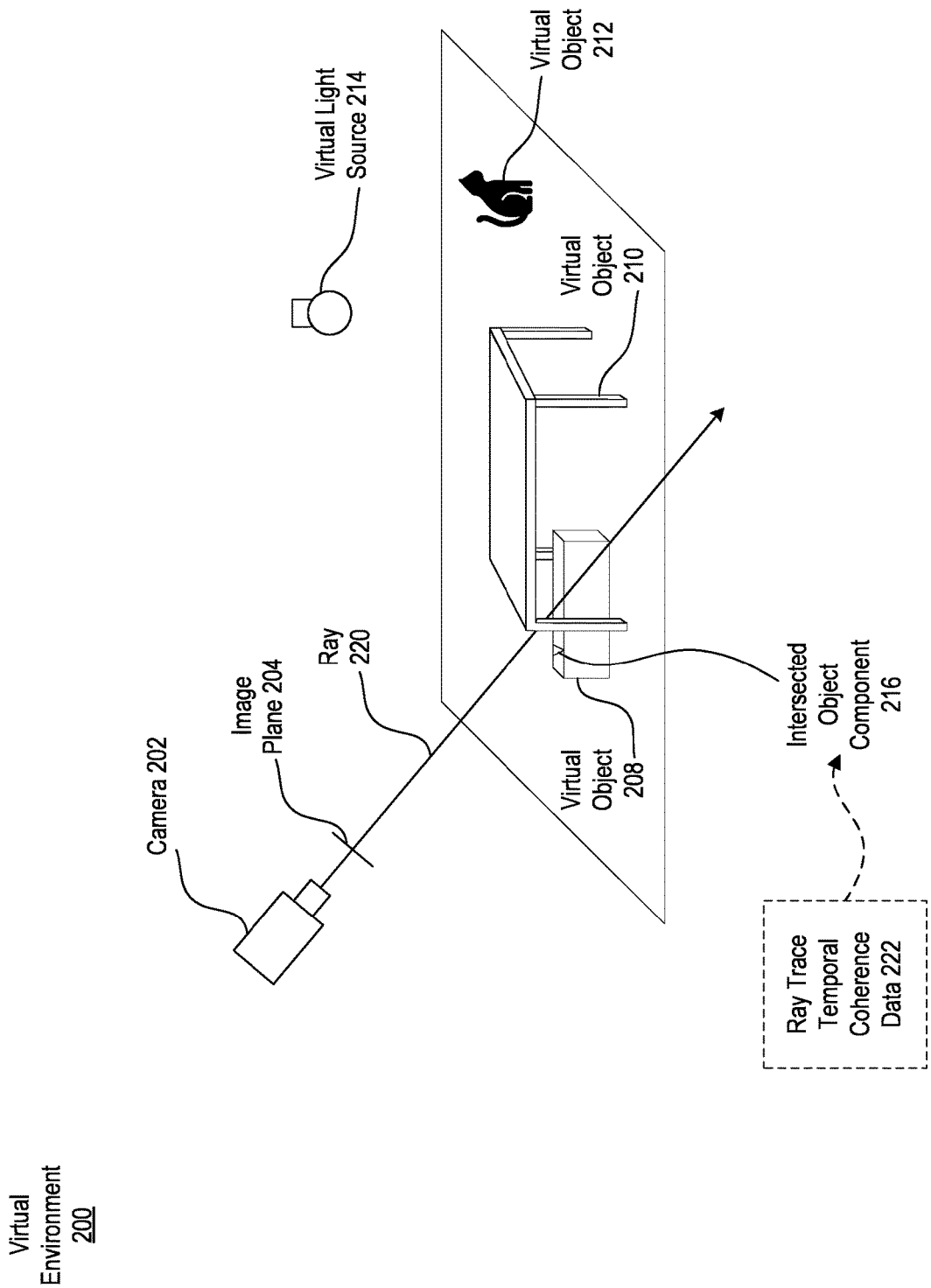
FIGS. 2C through 2F depict conceptual representations of example ray trace temporal coherence data that may be used to determine an intersected object component for the ray trace operation of FIG. 2B.

FIG. 2C illustrates an example in which the ray trace temporal coherence data 222 used to determine an intersected object component for the ray trace operation associated with ray 220 includes the intersected object component 216 associated with the preceding ray trace operation (for ray 206 of FIGS. 2A and 2B). For example, rather than initially testing the ray 220 against a top-level acceleration structure associated with the virtual environment 200, a system may instead test whether the ray 220 intersects with the previously intersected object component 216. Directly testing whether the ray 220 intersects with a single previously intersected object component 216 is computationally inexpensive, and, if successful, can advantageously allow a system to circumvent at least some computationally costly acceleration structure traversal.

Figure 2D:
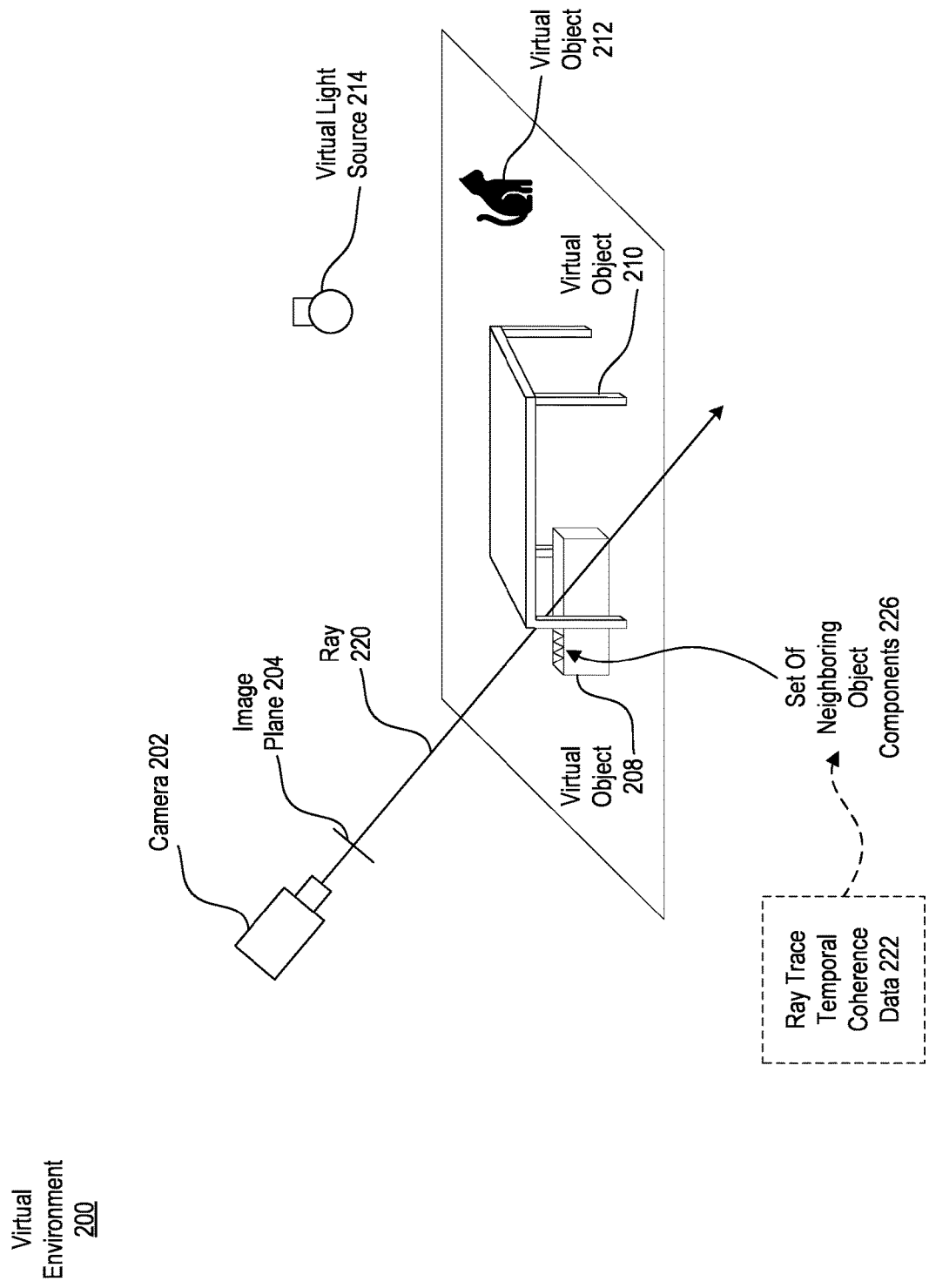

In some instances, as shown in FIG. 2C, a current ray 220 does not intersect with a previously intersected object component 216. Notwithstanding, the previously intersected object component 216 may be indicative of the general positioning of the object component within the virtual environment 200 that the current ray 220 intersects with. Accordingly, FIG. 2D illustrates that, in some implementations, ray trace temporal coherence data 222 includes a set of neighboring object components 226. In the example of FIG. 2D, the set of neighboring object components 226 includes the preceding intersected object component 216, as well as neighboring object components.

Thus, rather than initially testing the ray 220 against a top-level acceleration structure associated with the virtual environment 200, a system may instead test whether the ray 220 intersects with the set of neighboring object components 226. Directly testing whether the ray 220 intersects with the set of neighboring object components 226 is relatively computationally inexpensive (e.g., relative to testing the ray 220 against an entire acceleration structure), and, if successful, can advantageously allow a system to circumvent at least some computationally costly acceleration structure traversal.

Figure 2E:
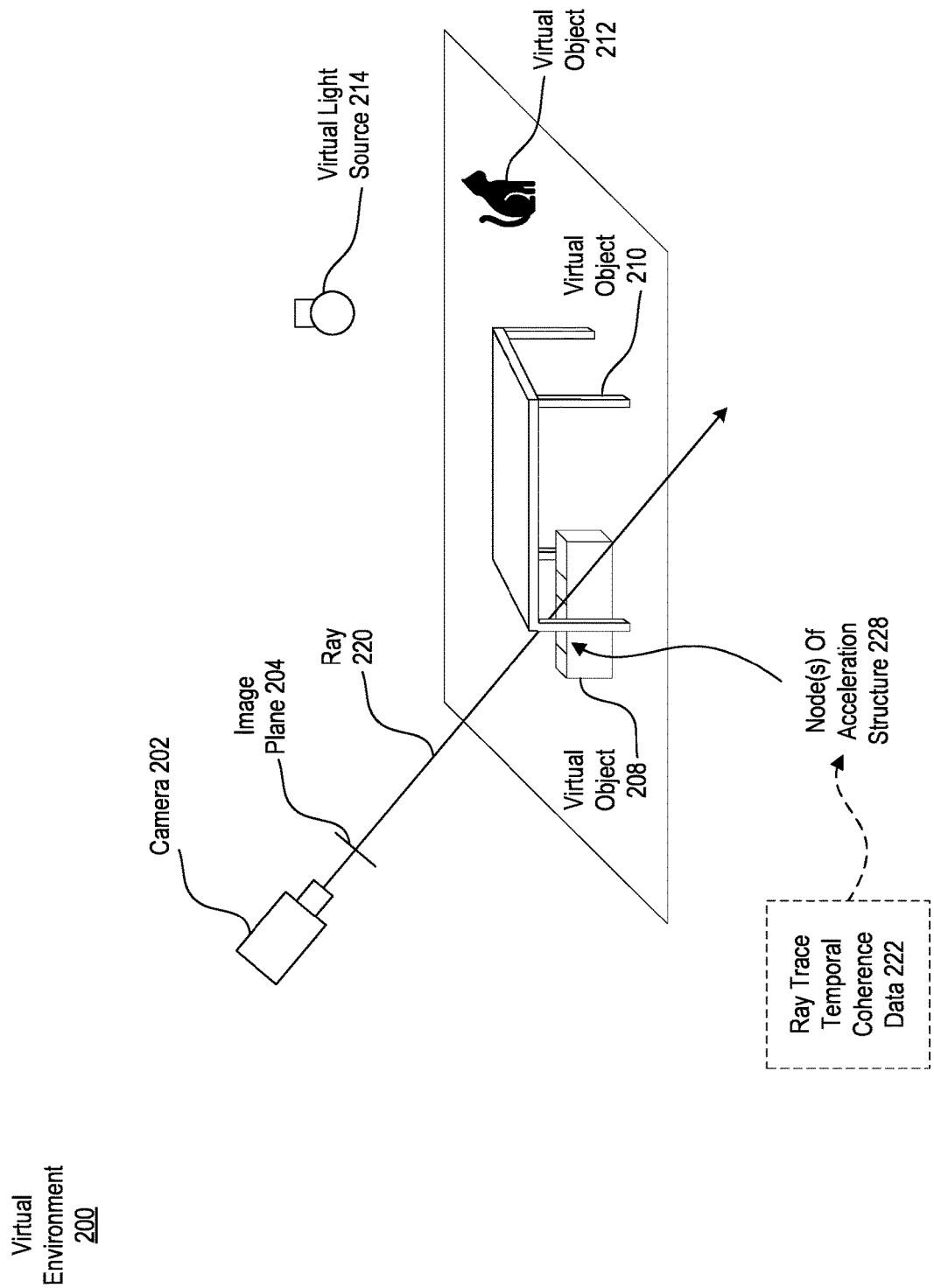

In some instances, as shown in FIG. 2D, a current ray 220 does not intersect with a set of neighboring object components 226 (that includes the previously intersected object component 216). FIG. 2E illustrates that, in some implementations, ray trace temporal coherence data 222 includes one or more particular node(s) of an acceleration structure 228. In the example of FIG. 2E, the node(s) of the acceleration structure 228 encompass the preceding intersected object component 216. The node(s) of the acceleration structure 228 may be associated with any layer of an overarching acceleration structure or may be at least part of an acceleration structure that is object-specific. Although FIG. 2E depicts the nodes of the acceleration structure 228 as rectangular, one will appreciate that any acceleration structure node shape(s) is/are within the scope of the present disclosure.

Thus, rather than initially testing the ray 220 against a top-level acceleration structure associated with the virtual environment 200, a system may instead test the ray 220 against one or more specific node(s) of an acceleration structure 228. As discussed above, testing the ray 220 against node(s) of the acceleration structure 228 may include testing whether the ray 220 intersects with any initial-layer nodes of the node(s) of the acceleration structure 228, and, in response to determining that the ray 220 intersects with a particular node of the initial-layer nodes, testing whether the ray 220 intersects with (i) any child nodes of the particular node or (ii) any object components encompassed by the particular node (e.g., if the particular node is in a final node layer of the acceleration structure). If the ray 220 is determined to intersect with a particular child node (in accordance with (i)), similar processing may be performed for the particular child node (testing the ray 220 against child nodes or object components of the particular child node) until object components are ultimately reached/tested.

Directly testing whether the ray 220 intersects with the intelligently selected node(s) of an acceleration structure 228 is relatively computationally inexpensive (e.g., relative to testing the ray 220 against an entire acceleration structure), and, if successful, can advantageously allow a system to circumvent at least some computationally costly acceleration structure traversal.

Figure 2F:
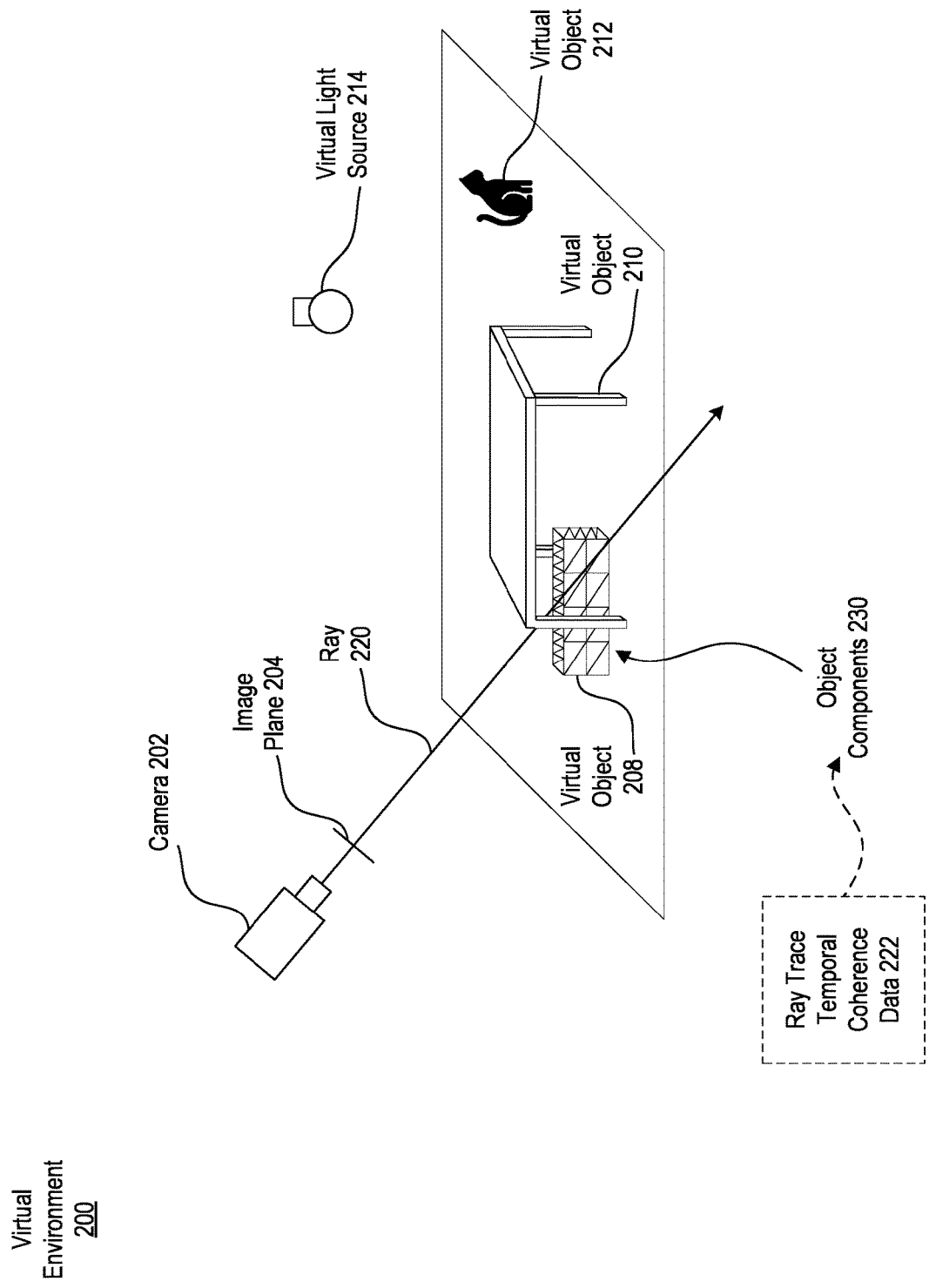

FIG. 2F provides an example in which the ray trace temporal coherence data 222 includes a plurality of object components 230 of the virtual object 208 that includes the preceding intersected object component 216 (i.e., the box). The plurality of object components 230 may include all object components of the virtual object 208 that includes the preceding intersected object component 216, or some subset of the object components of the virtual object 208. Rather than initially testing the ray 220 against a top-level acceleration structure associated with the virtual environment 200, a system may instead test whether the ray 220 intersects with the plurality of object components 230 of the virtual object 208 that includes the preceding intersected object component 216. Directly testing whether the ray 220 intersects with the plurality of object components 230 is relatively computationally inexpensive (e.g., relative to testing the ray 220 against an entire acceleration structure), and, if successful, can advantageously allow a system to circumvent at least some computationally costly acceleration structure traversal.

Figure 2G:
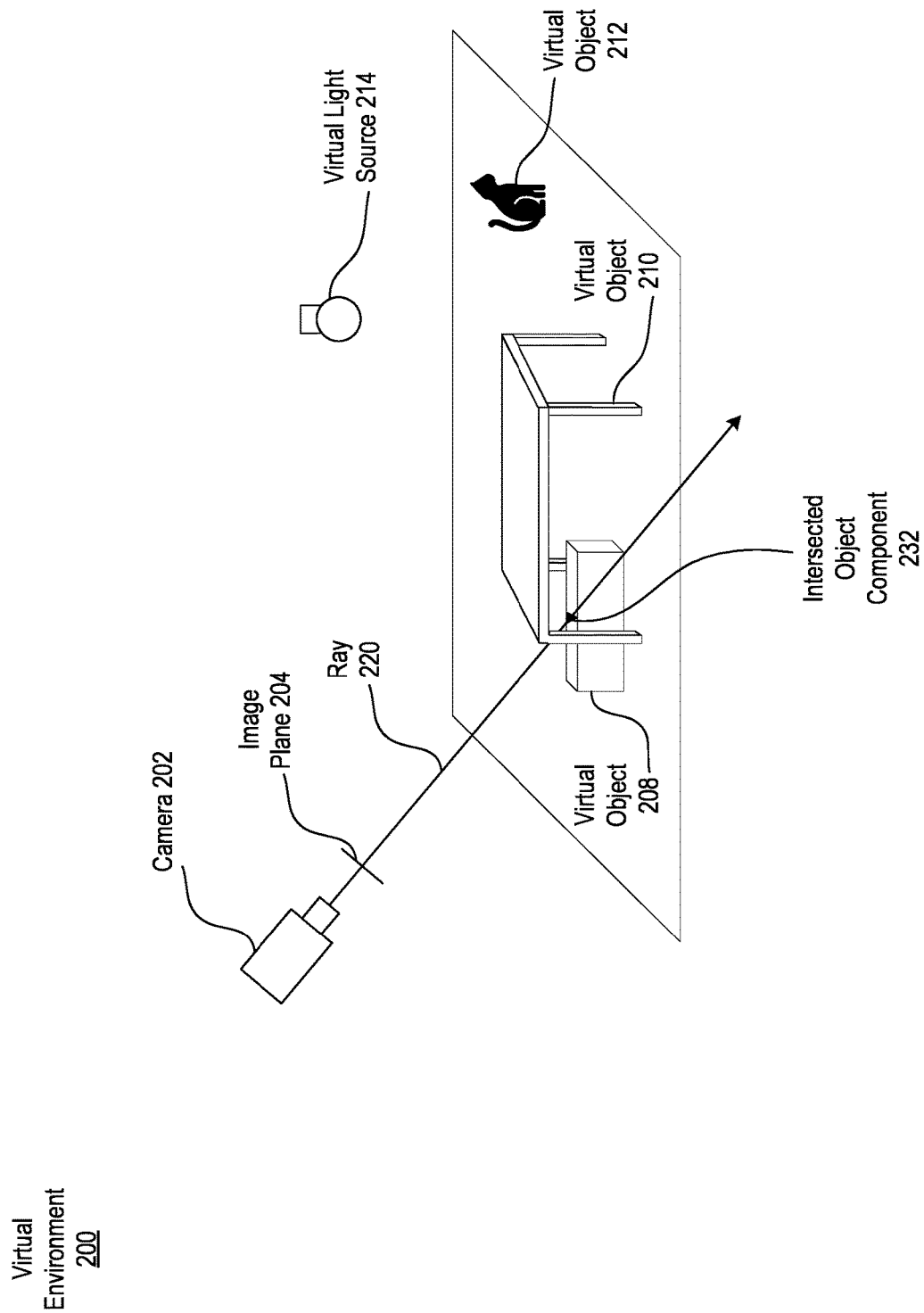
FIG. 2G illustrates the intersected object component for the ray trace operation of FIG. 2B.

FIG. 2G illustrates an intersected object component 232 for the ray trace operation associated with ray 220 (which is temporally subsequent to the ray trace operation associated with ray 206 of FIGS. 2A and 2B). In the example of FIG. 2G, the intersected object component 232 is determined utilizing ray trace temporal coherence data 222 as described with reference to the examples of FIGS. 2B through 2F. As noted above, the ray trace temporal coherence data 222 is based on a preceding ray trace operation (e.g., associated with ray 206 of FIGS. 2A and 2B).

One will appreciate, in view of the present disclosure, that the different types of ray trace temporal coherence data 222 described hereinabove may be intelligently selected and/or used in combination with one another as part of a multi-step process. For example, in instances where object motion and/or camera motion satisfies one or more thresholds or conditions, ray trace temporal coherence data may be selected that provides a broader search space (e.g., in the case of large amounts of motion) or a narrower search space (e.g., in the case of small amounts of motion) for determining an intersected object component (e.g., a broader set of acceleration structure nodes or object components).

Furthermore, one will appreciate that a system may utilize different types of temporal coherence data to determine an intersected object component if an initial test fails to determine an intersected object component. For an instance, a system may first test a current ray against a precedingly intersected object component, and, if the current ray does not intersect with the precedingly intersected object component, the system may proceed to test the current ray against a set of neighboring object components that includes the precedingly intersected object component, and, if the current ray does not intersect with the set of neighboring object components, the system may proceed to test the current ray against all object components of the virtual object that includes the precedingly intersected object component, and, if the current ray does not intersect with all object components of the virtual object that includes the precedingly intersected object component, the system may proceed to test the current ray against a particular set of nodes of an acceleration structure that includes the precedingly intersected object component, and, if the current ray does not intersect with the particular set of nodes of the acceleration structure, the system may proceed to test the current ray against one or more broader acceleration structures (e.g., a top-level acceleration structure).

One will appreciate, in view of the present disclosure, that a system may selectively refrain from testing a ray against object components and/or acceleration structure nodes that have already been tested. For instance, a system that has already tested a set of object components or particular nodes of an acceleration structure in accordance with ray trace temporal coherence data may selectively refrain from repeatedly testing the same set of object components or particular nodes of the acceleration structure when performing further testing (e.g., against an overarching acceleration structure) to determine an intersected object component for a particular ray.

In some instances, although an intersected object component 232 can be detected for the ray 220 utilizing ray trace temporal coherence data 222, a closer object component may exist in the virtual environment 200 that the ray 220 intersects with. For example, in some instances, one or more moving/movable objects exist in the virtual environment 200, which may move between the acquisition of one frame (e.g., a frame with which ray 206 from FIGS. 2A and 2B is associated) and a consecutive frame (e.g., a frame with which ray 220 from FIGS. 2B through 2G is associated). For example, in virtual environment 200, virtual object 212 (e.g., a cat) may move and therefore assume different positions/poses within the virtual environment 200 from frame to frame, such that the virtual object 212 does not intervene between the camera 202 and the virtual object 208 (e.g., a box) in one frame but does intervene between the camera 202 and the virtual object 208 in a subsequent frame. In this regard, after determining an intersected object component 232 for a current ray 220 using ray trace temporal coherence data 222, a system may perform further testing to determine whether a closer object component exist within the virtual environment 200 than the intersected object component 232 determined via ray trace temporal coherence data 222.

Figure 2H:
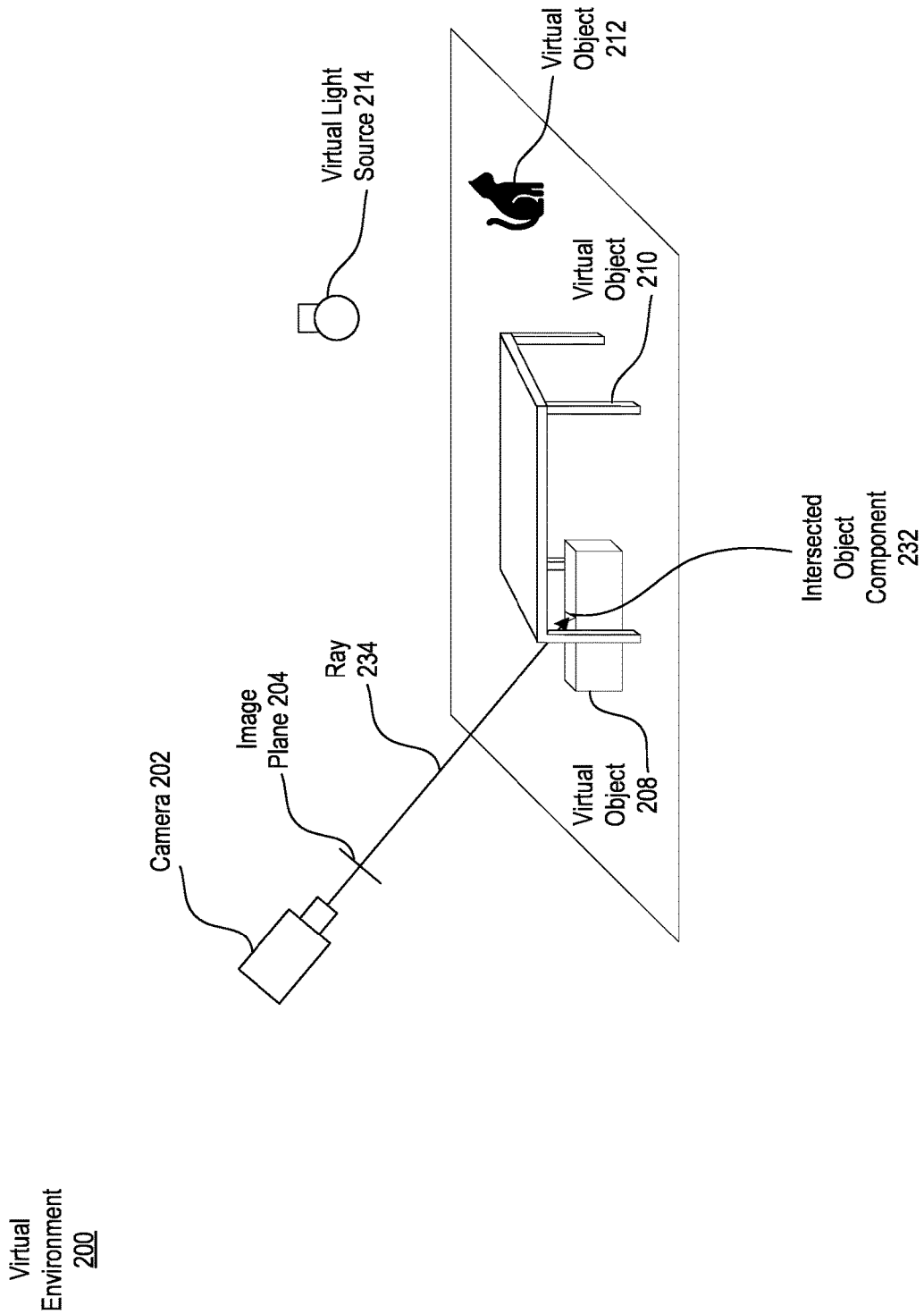
FIG. 2H illustrates a conceptual representation of a shortened ray based upon the intersected object component of FIG. 2G.

To this end, FIG. 2H illustrates a shortened ray 234, which comprises a shortened version of ray 220 described hereinabove with reference to FIGS. 2B through 2G. Ray 234 extends only from the camera 202 to the intersected object component 232 (e.g., determined via ray trace temporal coherence data 222). A system may test the shorter ray 234 (e.g., shorter relative to ray 220) against various nodes and/or object components to determine whether the ray 234 intersects with another object component between the camera 202 and the intersected object component 232. By utilizing a shortened ray 234, a system may refrain from testing the shortened ray 234 against object components or acceleration structure nodes that extend beyond the intersected object component 232 (from the origin point or camera 202).

In some instances, a system tests the shorter ray 234 against nodes of an overarching acceleration structure to determine whether the ray 234 intersects with another object that is nearer to the camera 202 than the intersected object component 232. In some instances, a system determines a set of candidate virtual objects within the virtual environment against which to test the shortened ray 234, which can facilitate improved computational efficiency. In one example, the set of candidate virtual object is selected based upon motion attributes of virtual objects in the virtual environment 200. For instance, the set of candidate virtual objects may include virtual objects in the virtual environment that have moved (e.g., being associated with a nonzero motion vector or other motion) or that are classified as movable.

As noted hereinabove, the principles discussed herein related to utilizing ray trace temporal coherence data are not limited to instances where rays are traced from a view frustrum (e.g., where the origin point for rays corresponds to a viewing perspective or camera 202). For example, a ray trace operation may be performed to determine visual characteristics/attributes of object components within the virtual environment 200 that will be represented by a display pixel (e.g., object components intersected by a ray traced from a camera through an image plane).

Figure 3A:
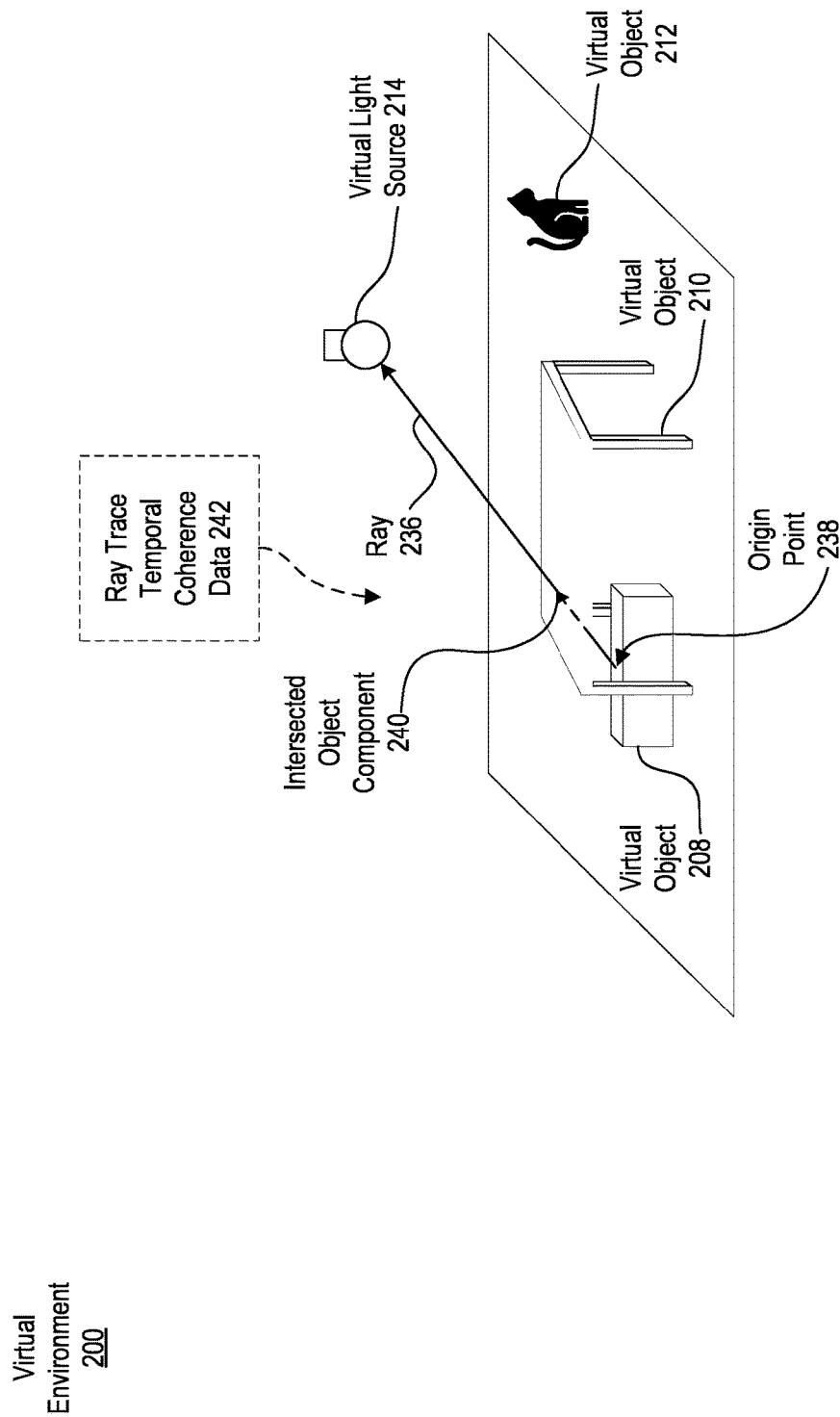
FIG. 3A illustrates a conceptual representation of another ray trace operation.

FIG. 3A illustrates the virtual environment 200 of FIGS. 2A through 2H, with a ray 236 traced from an origin point 238 associated with the intersected object component 232 of FIGS. 2G and 2H. In the example of FIG. 3A, the ray 236 is traced from the origin point 238 to determine visual characteristics of the intersected object component 232, such as shadow characteristics for accurately depicting the intersected object component 232 with a display pixel (e.g., a display pixel that corresponds to a pixel of the image plane 204 through which ray 220 was traced). In this regard, the ray 236 is traced from the origin point 238 toward the virtual light source 214 within the virtual environment 200. One will appreciate, in view of the present disclosure, that a ray may be traced from the origin point 238 along other ray paths (e.g., to mimic specular reflection).

FIG. 3A illustrates an intersected object component 240 of virtual object 210 (e.g., a table) that the ray 236 intersects with. Ray trace temporal coherence data 242 based upon the ray trace operation associated with ray 236 may be utilized for subsequent ray traces (from origin point 238 or other origin points, such as origin points on the virtual object 208 that are proximate to origin point 238). The ray trace temporal coherence data 242 may be implemented in various forms, such as the intersected object component 240, a set of object components proximate to or including the intersected object component 240, a set of node(s) of an acceleration structure that encompasses the intersected object component 240, etc.

Figure 3B:
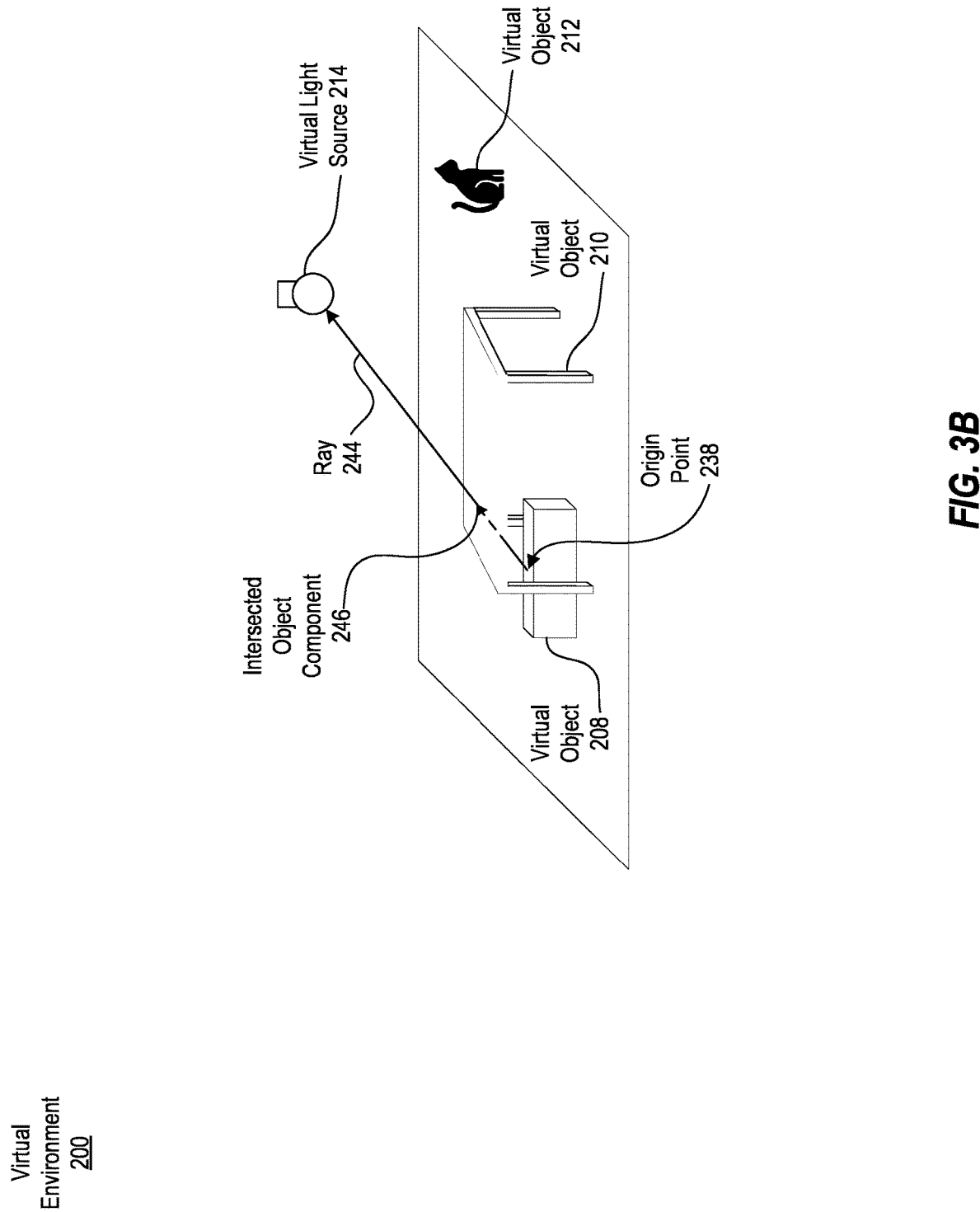
FIG. 3B illustrates a conceptual representation of an example ray trace operation that is temporally subsequent to the ray trace operation of FIG. 3A and that uses ray trace temporal coherence data associated with the ray trace operation of FIG. 3A to determine an intersected object component.

FIG. 3B illustrates a subsequent ray trace operation in which a ray 244 is cast from origin point 238. In the example of FIG. 3B, the ray trace temporal coherence data 242 from the preceding ray trace operation associated with ray 236 (FIG. 3A) is utilized to determine that the ray 244 intersects with intersected object component 246 of the virtual object 210 (e.g., the table). The intersected object component 246 can indicate that the origin point 238 is within the shadow of the intersected object component 246 (or otherwise blocked from direct incidence of light from the virtual light source 214). In some instances, such a determination is sufficient to indicate shadow properties of the origin point 238 (and the object component associated therewith). In some instances, such as where the origin point is associated with a surface that causes specular reflection, additional ray trace operations may be performed to determine whether a ray from the origin point 238 intersects with a closer object component, which would affect reflection characteristics of the origin point 238.

Figure 3C:
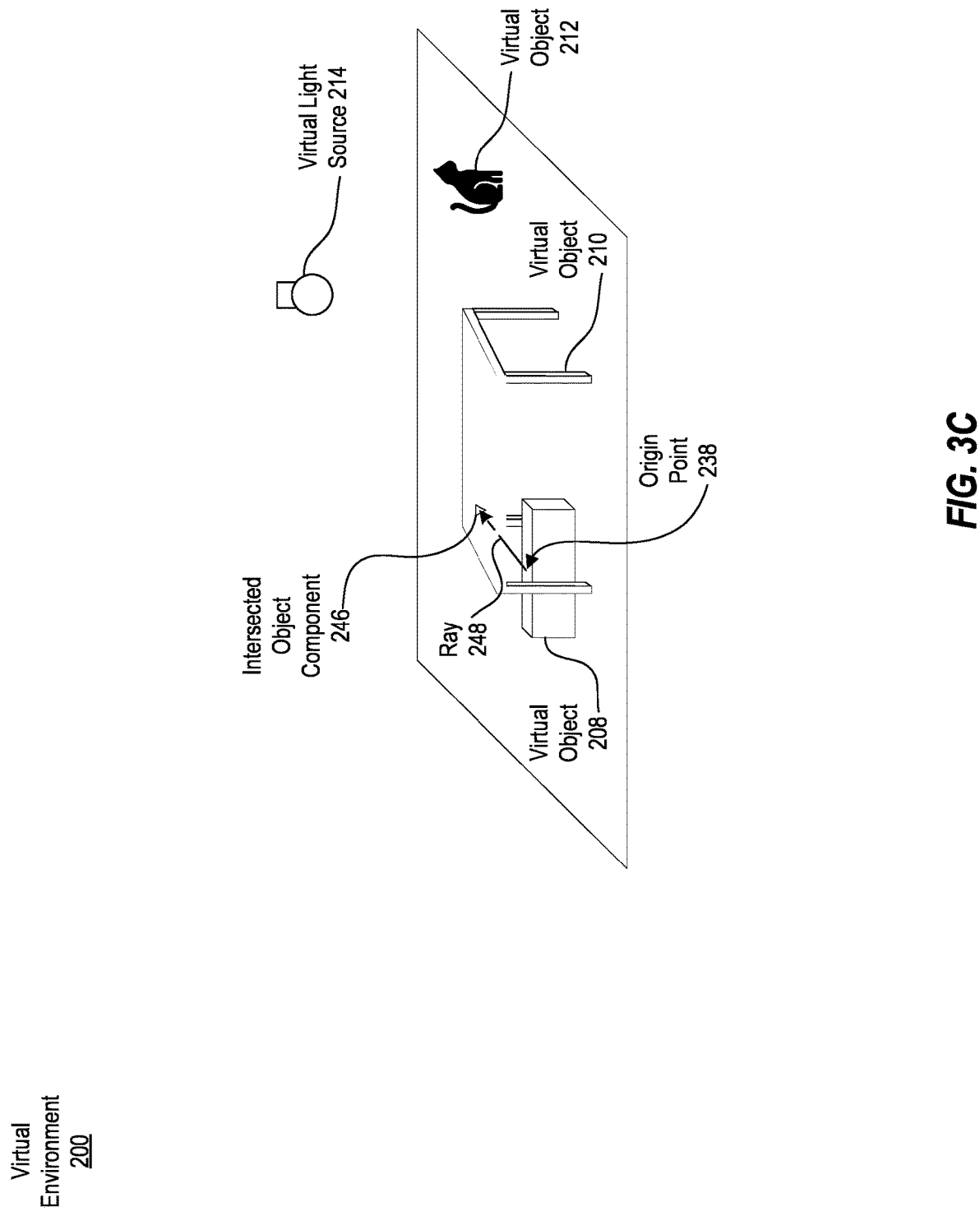
FIG. 3C illustrates a conceptual representation of a shortened ray based upon the intersected object component of FIG. 3B.

FIG. 3C illustrates a shortened ray 248 based upon the ray 244 (from FIG. 3B) that extends from the origin point 238 to the intersected object component 246. A system may test the shortened ray 248 against one or more object components (e.g., candidate object components associated with moved/movable virtual objects) and/or acceleration structures to determine whether the ray 248 intersects with an object component that is closer to the origin point 238 than the intersected object component 246. The system may thus advantageously refrain from testing the ray 248 against object components positioned between the intersected object component 246 and the virtual light source 214 within the virtual environment 200.

As will be described in more detail hereinbelow, ray trace temporal coherence data may be utilized in conjunction with ray trace spatial coherence data.

Ray Tracing Using Spatial Coherence Data

Figure 4A:
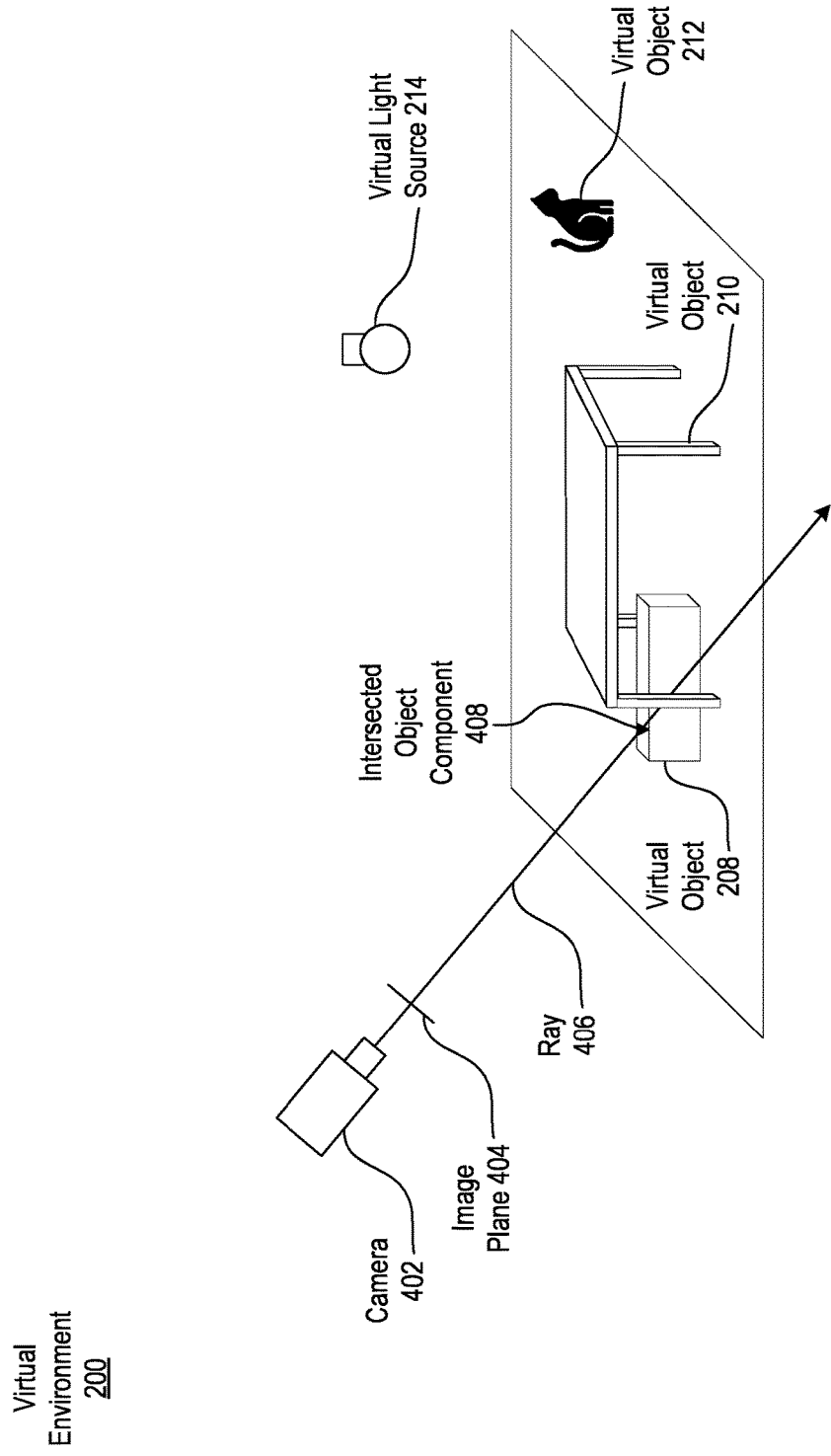
FIG. 4A illustrates a conceptual representation of an example virtual environment in which a ray trace operation is performed.

FIG. 4A illustrates a conceptual representation of the virtual environment 200 described hereinabove with reference to FIGS. 2A through 3C. FIG. 4A illustrates a camera 42 positioned within the virtual environment 200, which can represent a view frustrum associated with a user experience. One or more ray trace operations may be performed to determine portions of the virtual environment 200 that are visible from the perspective of the camera 402. As depicted in FIG. 4A, a ray trace operation may include tracing a ray 406 from an origin point (e.g., the camera 402) through a pixel of an image plane 404 and into the virtual environment 200.

FIG. 4A illustrates an intersected object component 408 (e.g., a mesh triangle) of the virtual object 208 that the ray 406 intersects with. A display pixel corresponding to the pixel on the image plane 404 through which the ray 406 was traced may be configured/controlled to depict/represent the intersected object component 408 of the virtual object 208 (e.g., for a particular frame). Properties of the virtual object 208 may be accessed and/or determined (which may include additional ray trace operations, see FIGS. 5A through 5C) to facilitate realistic representation of the intersected object component 408 with the corresponding display pixel.

The intersected object component 408 that the ray 406 intersects with can be determined utilizing conventional ray tracing techniques (e.g., utilizing one or more acceleration structures associated with the virtual environment 200) and/or utilizing ray trace temporal coherence data as discussed hereinabove with reference to FIGS. 2B through 2H.

Figure 4B:
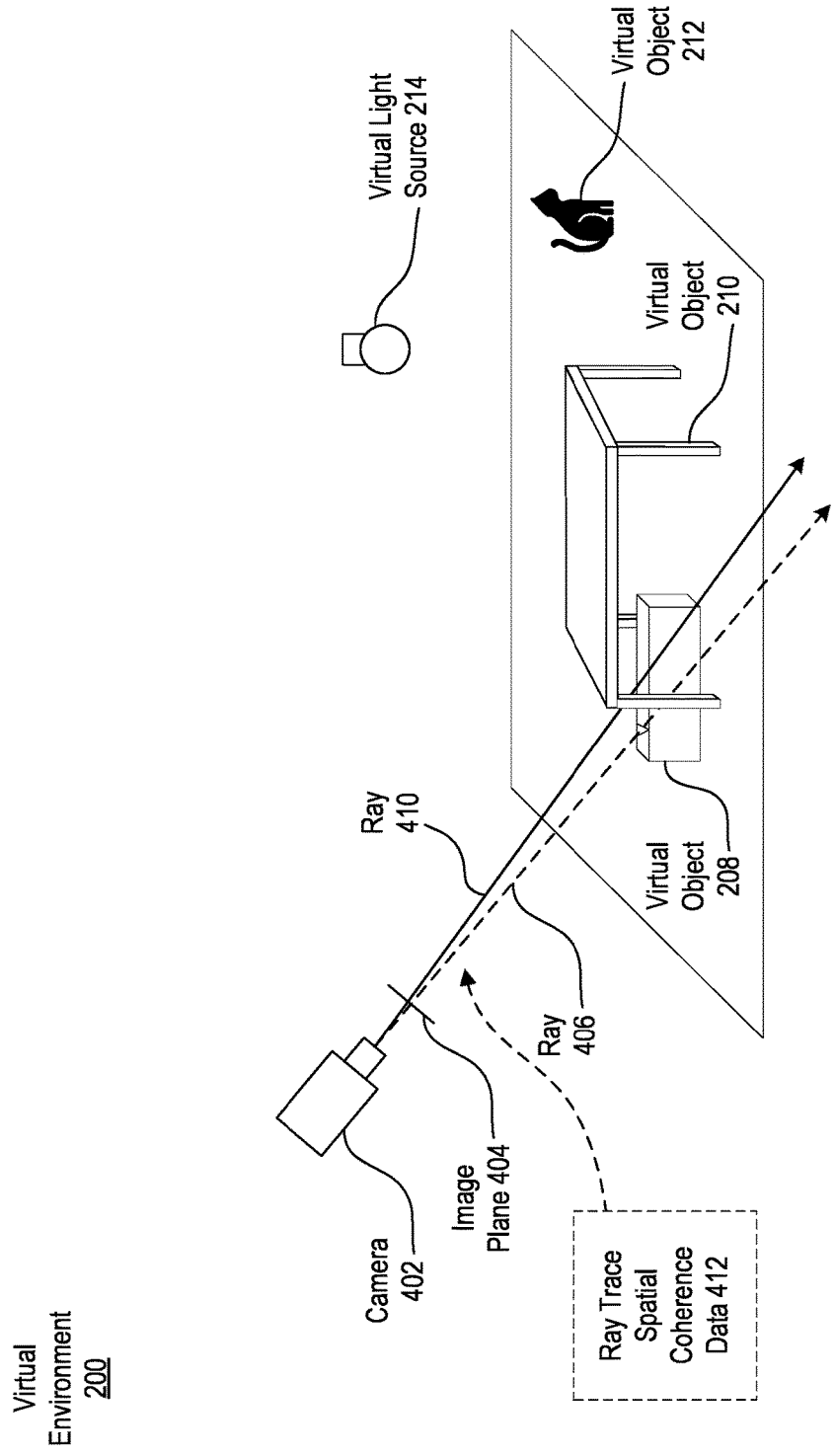
FIG. 4B illustrates a conceptual representation of an example ray trace operation that is spatially proximate to the ray trace operation of FIG. 4A.

FIG. 4B illustrates the virtual environment 200 of FIG. 4A at the same timepoint as that shown in FIG. 4A. FIG. 4B illustrates the ray 406 of FIG. 4A with a broken line. FIG. 4B illustrates another ray 410 that is traced from the camera 402 and through the image plane 404 into the virtual environment. In the example of FIG. 4B, ray 406 and ray 410 are traced through different pixels of the image plane 404 to determine pixel content for different pixels in the same frame for representing the virtual environment 200.

Information from the ray trace operation associated with the ray 406 may be leveraged to facilitate efficient determination of the object component(s) that the ray 410 intersects with. FIG. 4B conceptually depicts information from the ray trace operation associated with the ray 406 as ray trace spatial coherence data 412.

Similar to ray trace temporal coherence data, ray trace spatial coherence data 412 may take on various forms and/or may be leveraged in various ways. Example implementations of ray trace spatial coherence data 412 will be provided below with reference to FIGS. 4C through 4F. Although these examples focus, in at least some respects, on utilizing ray trace spatial coherence data 412 associated with a single neighboring ray (e.g., ray 406) traced through a neighboring pixel of the image plane 404, ray trace spatial coherence data 412 used for a target ray trace operation may include information associated with one or more additional (or alternative) rays traced through one or more different pixels of the image plane 404 (and which may be associated with one or more preceding timepoints or image frames). Although some examples herein focus on ray trace operations associated with a view frustrum, the principles discussed herein related to implementation of ray trace spatial coherence data may be utilized in other contexts (e.g., for rays traced from origin points associated with object components in the environment to determine shadow, reflection, and/or other properties/effects). Still furthermore, although at least some examples herein focus on ray tracing for determining visible object components and/or visual characteristics for object components, the principles discussed herein may be applied for other purposes (e.g., to determine sound propagation).

Figure 4C:
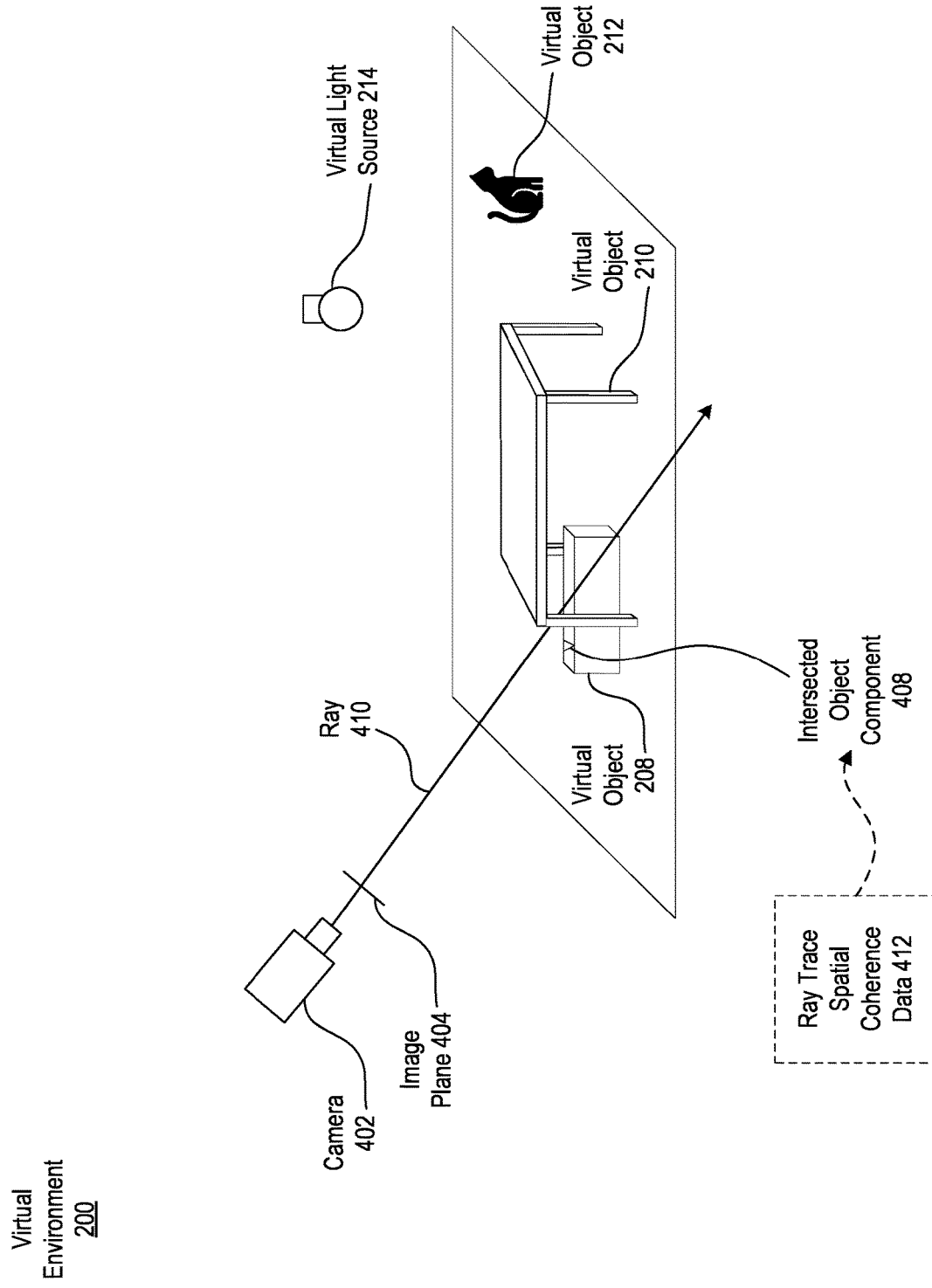
FIGS. 4C through 4F depict conceptual representations of example ray trace spatial coherence data that may be used to determine an intersected object component for the ray trace operation of FIG. 4B.

FIG. 4C illustrates an example in which the ray trace spatial coherence data 412 used to determine an intersected object component for the ray trace operation associated with ray 410 includes the intersected object component 408 associated with the ray trace operation for ray 406 of FIGS. 4A and 4B. For example, rather than initially testing the ray 410 against a top-level acceleration structure associated with the virtual environment 200, a system may instead test whether the ray 410 intersects with the intersected object component 408 of the neighboring ray 406. Directly testing whether the ray 410 intersects with a single intersected object component 408 associated with a neighboring ray 406 is computationally inexpensive, and, if successful, can advantageously allow a system to circumvent at least some computationally costly acceleration structure traversal.

Figure 4D:
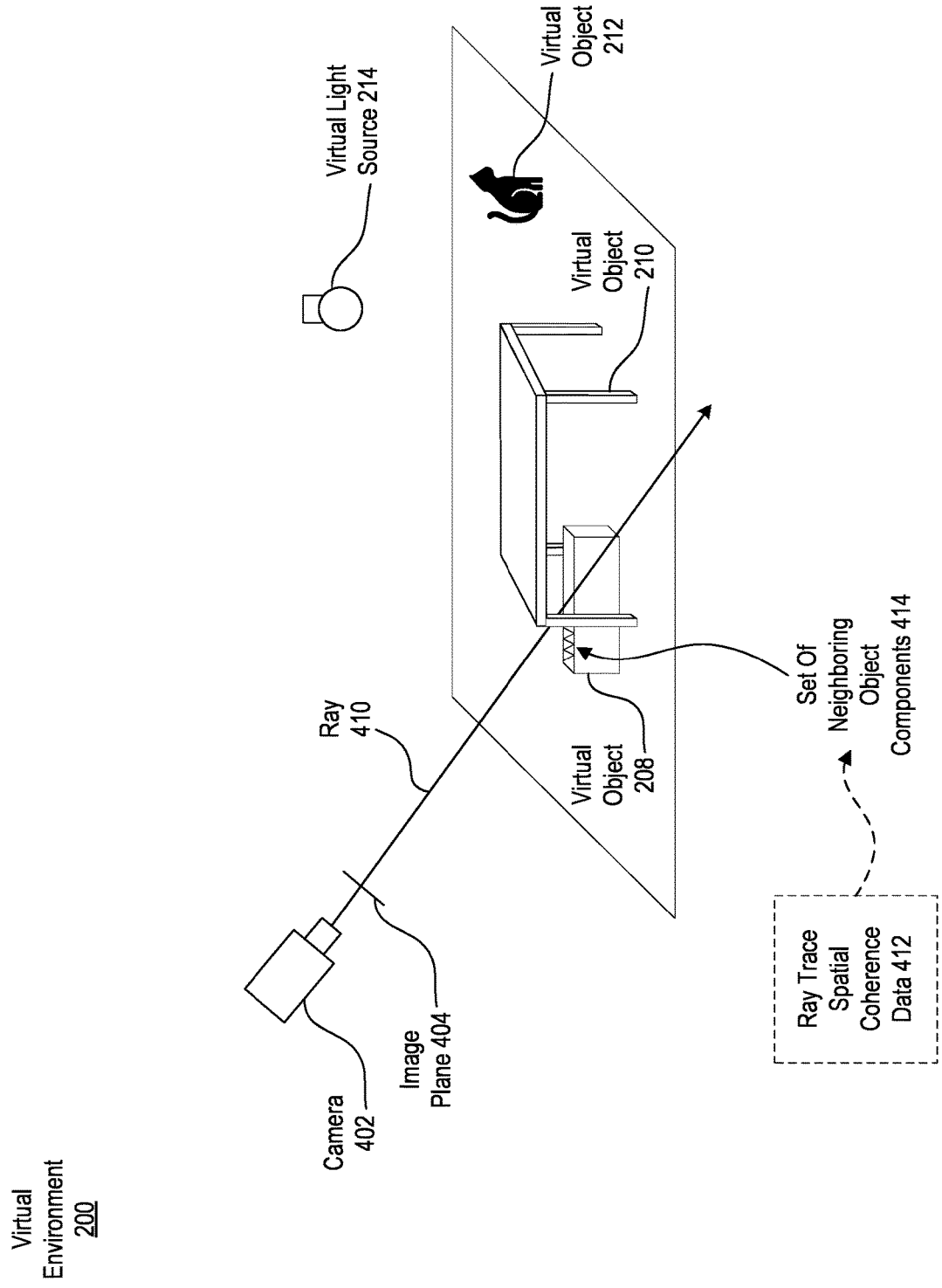

In some instances, as shown in FIG. 4C, a ray 410 does not intersect with an intersected object component 408 of a neighboring ray 406. Notwithstanding, the intersected object component 408 of the neighboring ray 406 may be indicative of the general positioning of the object component within the virtual environment 200 that the ray 410 intersects with. Accordingly, FIG. 4D illustrates that, in some implementations, ray trace spatial coherence data 412 includes a set of neighboring object components 414. In the example of FIG. 4D, the set of neighboring object components 414 includes the object component 408 associated with the neighboring ray 406, as well as neighboring object components that are proximate to the object component 408.

Thus, rather than initially testing the ray 410 against a top-level acceleration structure associated with the virtual environment 200, a system may instead test whether the ray 410 intersects with the set of neighboring object components 414. Directly testing whether the ray 410 intersects with the set of neighboring object components 414 is relatively computationally inexpensive (e.g., relative to testing the ray 410 against an entire acceleration structure), and, if successful, can advantageously allow a system to circumvent at least some computationally costly acceleration structure traversal.

Figure 4E:
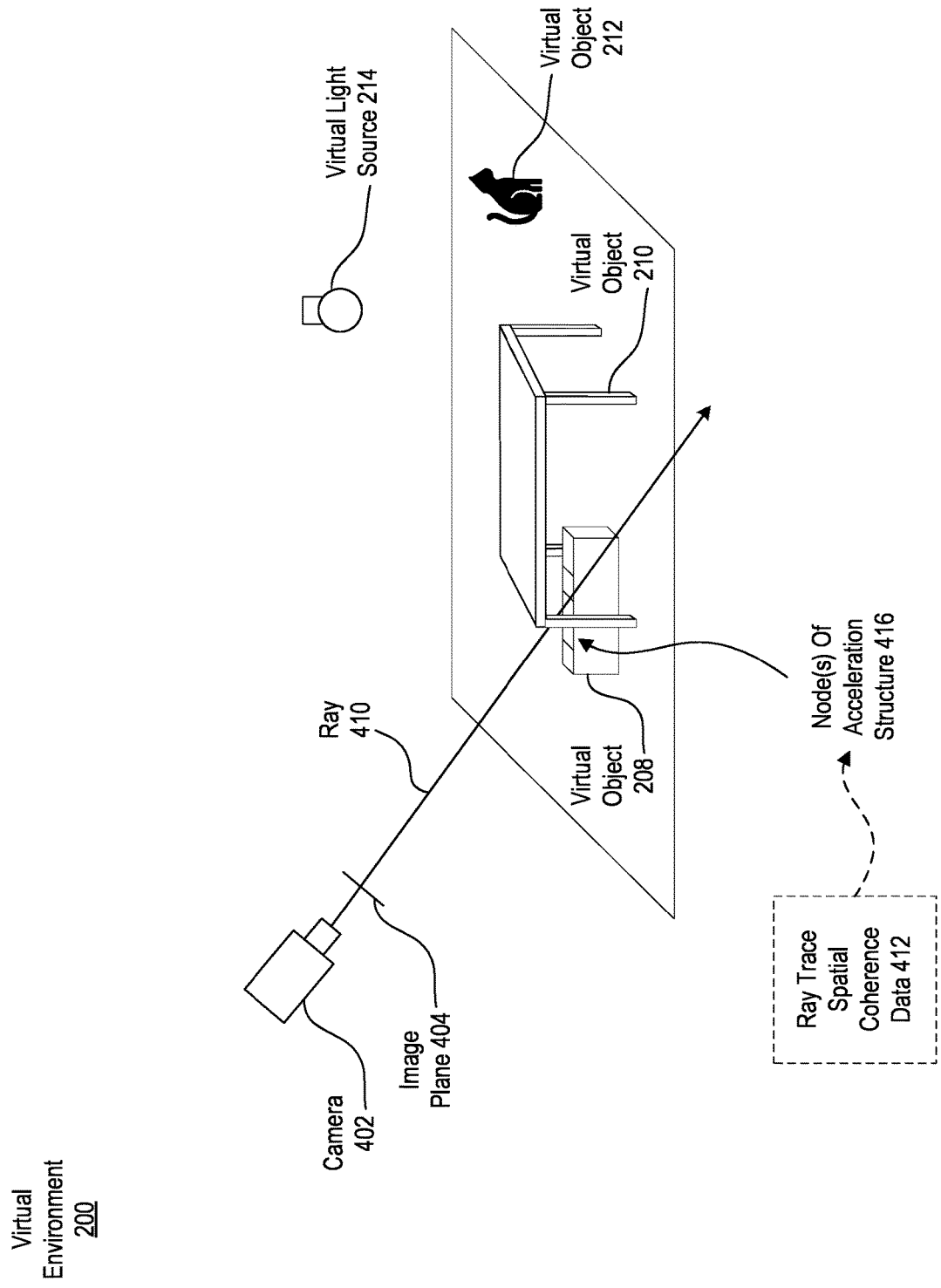

In some instances, as shown in FIG. 4D, a ray 410 does not intersect with a set of neighboring object components 414 (that includes the intersected object component 408 of the neighboring ray 406). FIG. 4E illustrates that, in some implementations, ray trace spatial coherence data 412 includes one or more particular node(s) of an acceleration structure 416. In the example of FIG. 4E, the node(s) of the acceleration structure 416 encompass the intersected object component 408 of the neighboring ray 406. The node(s) of the acceleration structure 416 may be associated with any layer of an overarching acceleration structure or may be at least part of an acceleration structure that is object-specific. Although FIG. 4E depicts the nodes of the acceleration structure 416 as rectangular, one will appreciate that any acceleration structure node shape(s) is/are within the scope of the present disclosure.

Thus, rather than initially testing the ray 410 against a top-level acceleration structure associated with the virtual environment 200, a system may instead test the ray 410 against one or more specific node(s) of an acceleration structure 416. As discussed above, testing the ray 410 against node(s) of the acceleration structure 416 may include testing whether the ray 410 intersects with any initial-layer nodes of the node(s) of the acceleration structure 416, and, in response to determining that the ray 410 intersects with a particular node of the initial-layer nodes, testing whether the ray 410 intersects with (i) any child nodes of the particular node or (ii) any object components encompassed by the particular node (e.g., if the particular node is in a final node layer of the acceleration structure). If the ray 410 is determined to intersect with a particular child node (in accordance with (i)), similar processing may be performed for the particular child node (testing the ray 410 against child nodes or object components of the particular child node) until object components are ultimately reached/tested.

Directly testing whether the ray 410 intersects with the intelligently selected node(s) of an acceleration structure 416 is relatively computationally inexpensive (e.g., relative to testing the ray 410 against an entire acceleration structure), and, if successful, can advantageously allow a system to circumvent at least some computationally costly acceleration structure traversal.

Figure 4F:
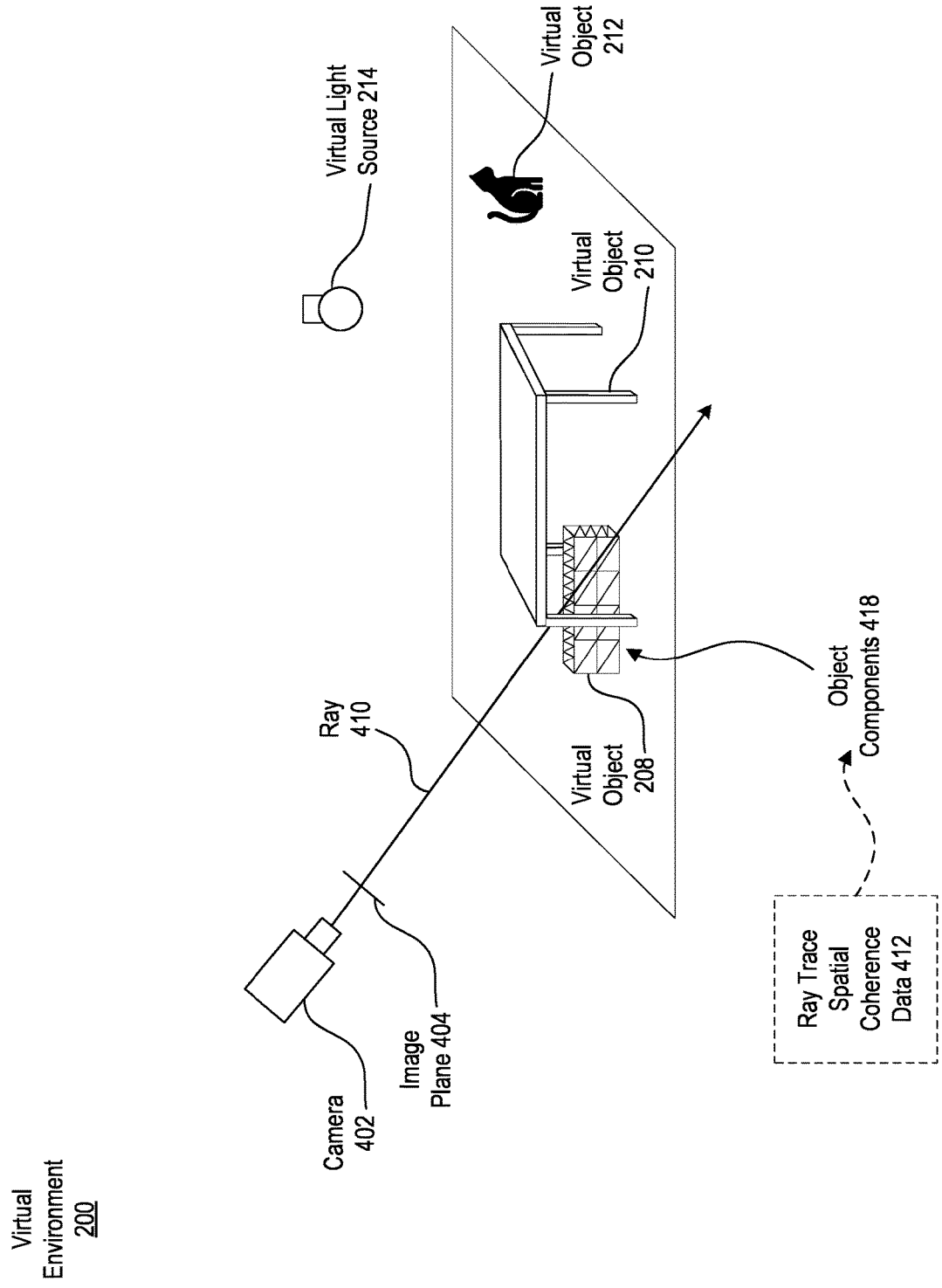

FIG. 4F provides an example in which the ray trace spatial coherence data 412 includes a plurality of object components 418 of the virtual object 208 that includes the intersected object component 408 of the neighboring ray 406 (i.e., the box). The plurality of object components 418 may include all object components of the virtual object 208 that includes the intersected object component 408 of the neighboring ray 406, or some subset of the object components of the virtual object 208. Rather than initially testing the ray 410 against a top-level acceleration structure associated with the virtual environment 200, a system may instead test whether the ray 410 intersects with the plurality of object components 418 of the virtual object 208 that includes the intersected object component 408 of the neighboring ray 406. Directly testing whether the ray 410 intersects with the plurality of object components 418 is relatively computationally inexpensive (e.g., relative to testing the ray 410 against an entire acceleration structure), and, if successful, can advantageously allow a system to circumvent at least some computationally costly acceleration structure traversal.

Figure 4G:
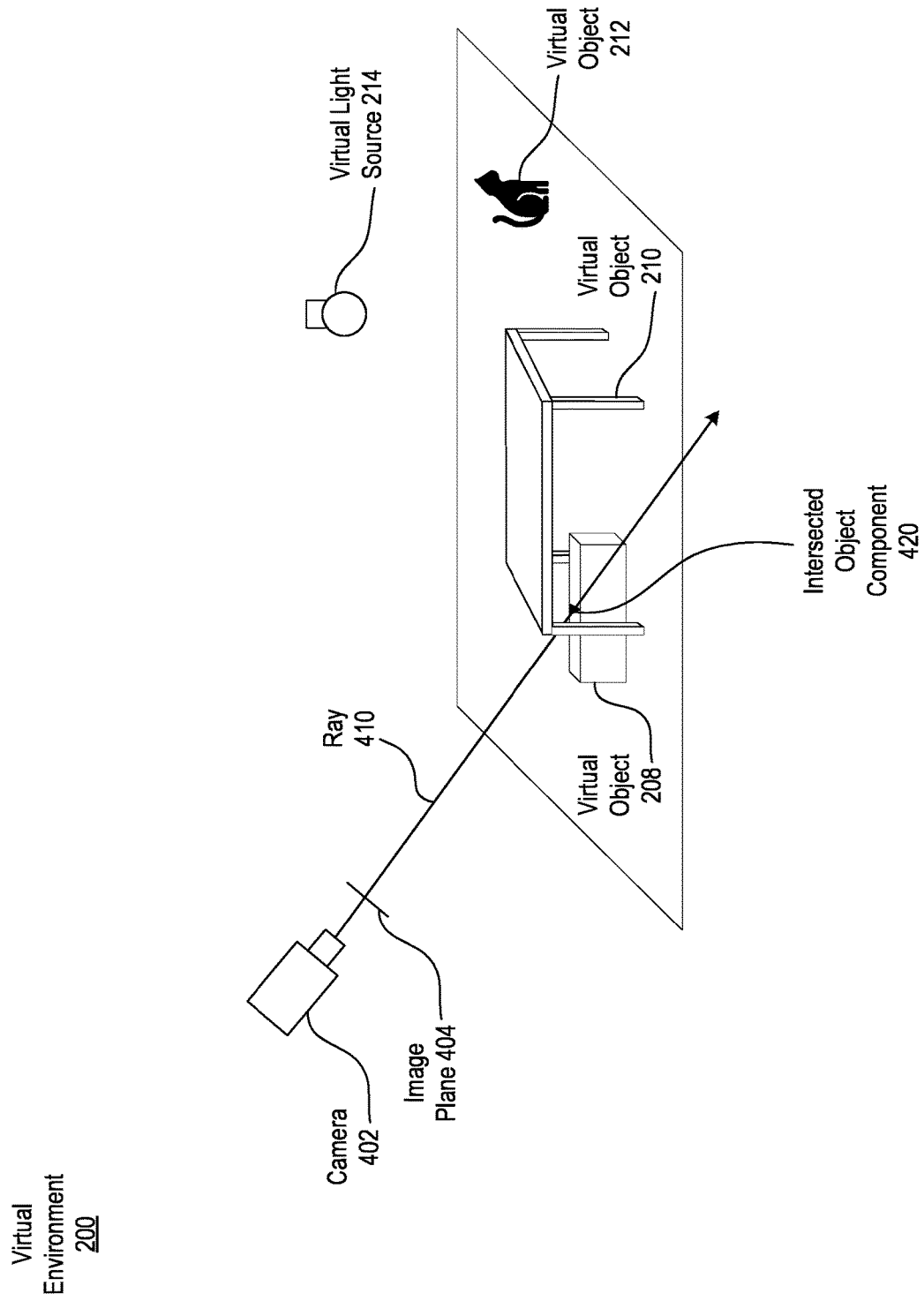
FIG. 4G illustrates the intersected object component for the ray trace operation of FIG. 4B.

FIG. 4G illustrates an intersected object component 420 for the ray trace operation associated with ray 410 (which is spatially proximate to ray 406 of FIGS. 4A and 4B). In the example of FIG. 4G, the intersected object component 420 is determined utilizing ray trace spatial coherence data 412 as described with reference to the examples of FIGS. 4B through 4F. As noted above, the ray trace spatial coherence data 412 is based on a neighboring ray trace operation (e.g., associated with ray 406 of FIGS. 4A and 4B).

One will appreciate, in view of the present disclosure, that the different types of ray trace spatial coherence data 412 described hereinabove may be intelligently selected and/or used in combination with one another as part of a multi-step process. Furthermore, one will appreciate that a system may utilize different types of spatial coherence data to determine an intersected object component if an initial test fails to determine an intersected object component. For an instance, a system may first test a ray against an intersected object component associated with a neighboring ray trace operation, and, if the ray does not intersect with the intersected object component associated with the neighboring ray trace operation, the system may proceed to test the ray against a set of neighboring object components that includes the intersected object component associated with the neighboring ray trace operation, and, if the ray does not intersect with the set of neighboring object components, the system may proceed to test the ray against all object components of the virtual object that includes the intersected object component associated with the neighboring ray trace operation, and, if the current ray does not intersect with all object components of the virtual object that includes the intersected object component associated with the neighboring ray trace operation, the system may proceed to test the ray against a particular set of nodes of an acceleration structure that includes the intersected object component associated with the neighboring ray trace operation, and, if the ray does not intersect with the particular set of nodes of the acceleration structure, the system may proceed to test the ray against one or more broader acceleration structures (e.g., a top-level acceleration structure).

One will appreciate, in view of the present disclosure, that a system may selectively refrain from testing a ray against object components and/or acceleration structure nodes that have already been tested. For instance, a system that has already tested a set of object components or particular nodes of an acceleration structure in accordance with ray trace spatial coherence data may selectively refrain from repeatedly testing the same set of object components or particular nodes of the acceleration structure when performing further testing (e.g., against an overarching acceleration structure) to determine an intersected object component for a particular ray.

In some instances, although an intersected object component 420 can be detected for the ray 410 utilizing ray trace spatial coherence data 412, a closer object component may exist in the virtual environment 200 that the ray 410 intersects with. In this regard, after determining an intersected object component 420 for a ray 410 using ray trace spatial coherence data 412, a system may perform further testing to determine whether a closer object component exist within the virtual environment 200 than the intersected object component 420 determined via ray trace spatial coherence data 412.

Figure 4H:
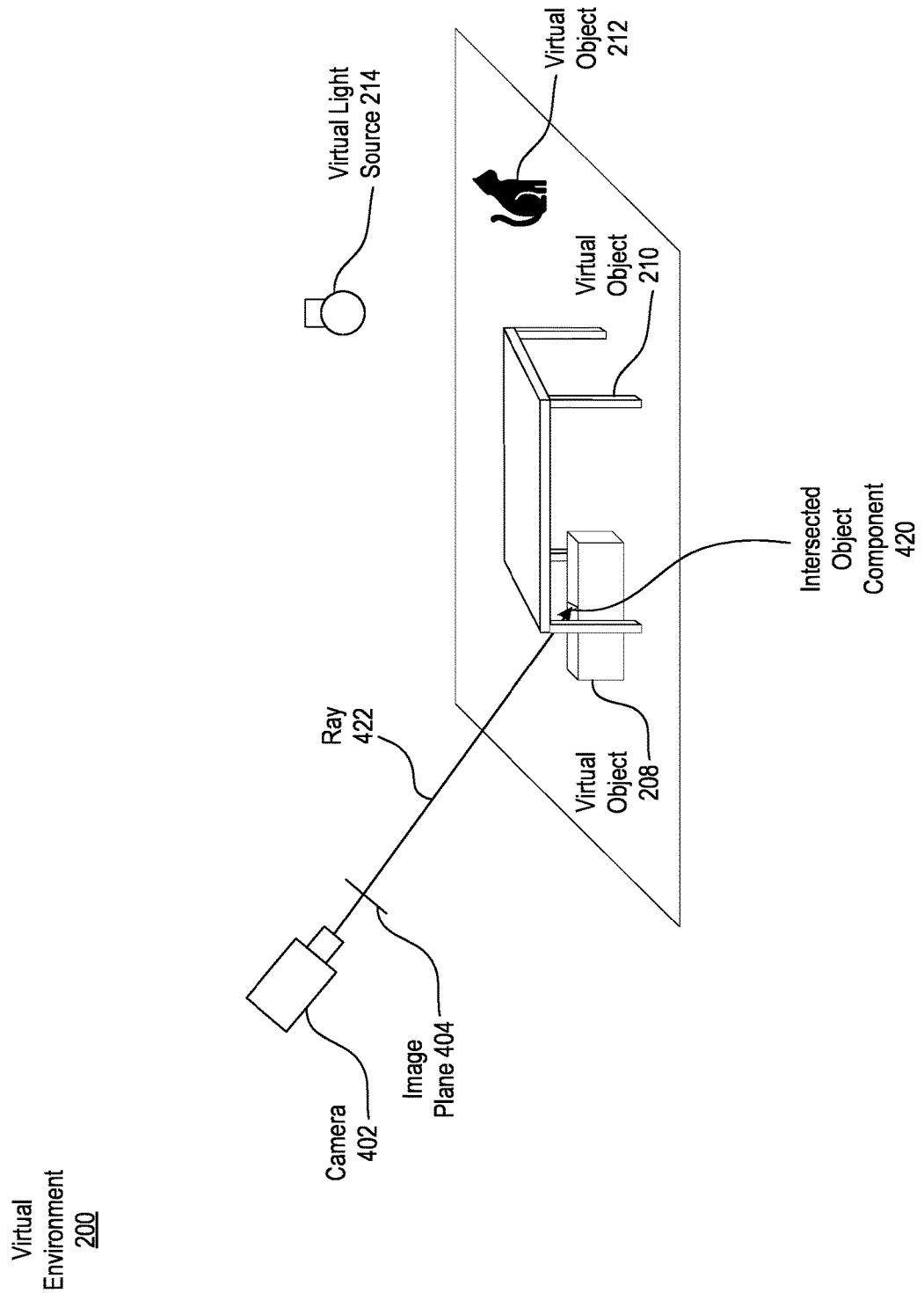
FIG. 4H illustrates a conceptual representation of a shortened ray based upon the intersected object component of FIG. 4G.

To this end, FIG. 4H illustrates a shortened ray 422, which comprises a shortened version of ray 410 described hereinabove with reference to FIGS. 4B through 4G. Ray 422 extends only from the camera 402 to the intersected object component 420 (e.g., determined via ray trace spatial coherence data 412). A system may test the shorter ray 422 (e.g., shorter relative to ray 410) against various nodes and/or object components to determine whether the ray 422 intersects with another object component between the camera 402 and the intersected object component 420. By utilizing a shortened ray 422, a system may refrain from testing the shortened ray 422 against object components or acceleration structure nodes that extend beyond the intersected object component 420 (from the origin point or camera 402).

As noted hereinabove, the principles discussed herein related to utilizing ray trace spatial coherence data are not limited to instances where rays are traced from a view frustrum (e.g., where the origin point for rays corresponds to a viewing perspective or camera 402). For example, a ray trace operation may be performed to determine visual characteristics/attributes of object components within the virtual environment 200 that will be represented by a display pixel (e.g., object components intersected by a ray traced from a camera through an image plane).

Figure 5A:
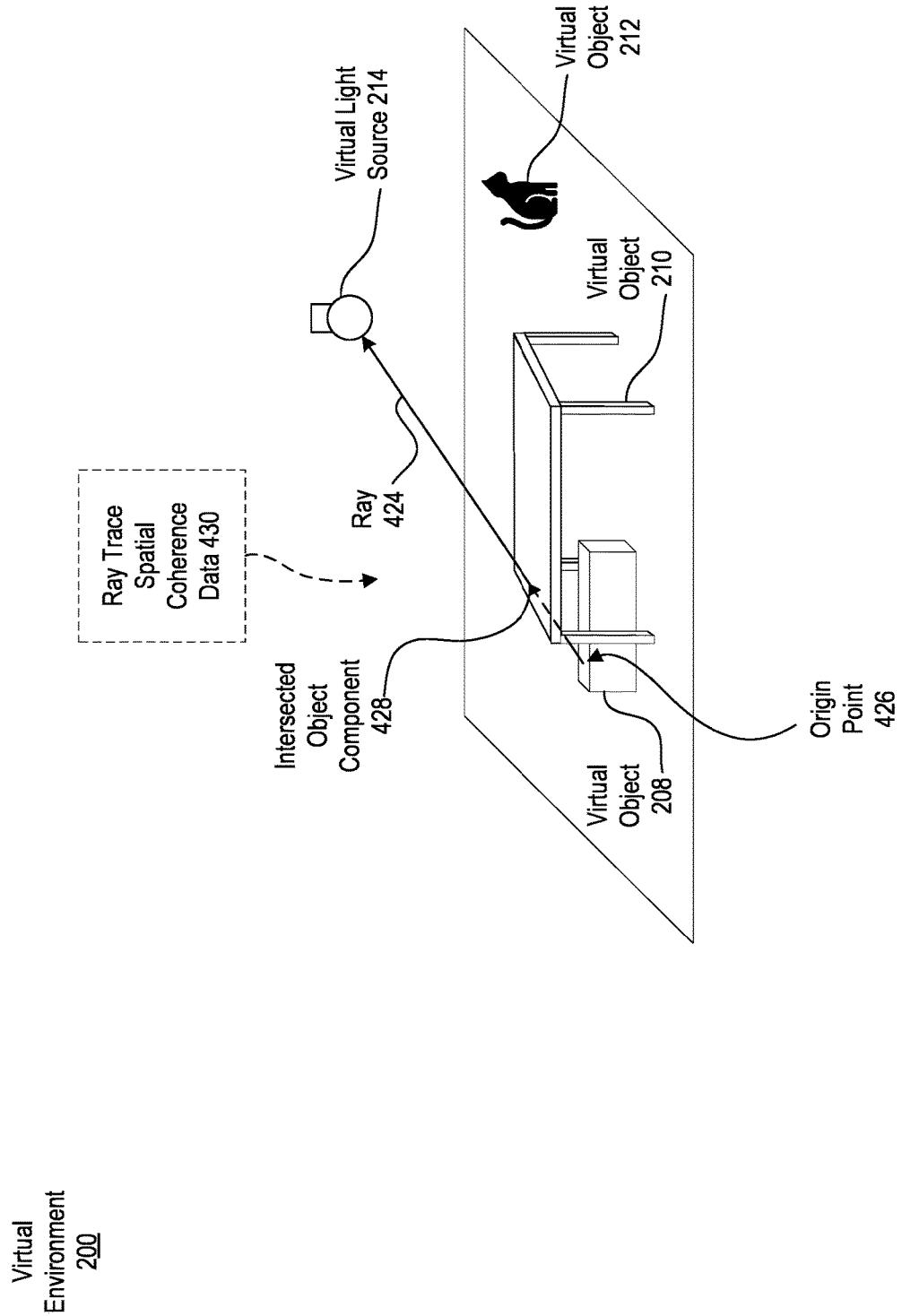
FIG. 5A illustrates a conceptual representation of another ray trace operation.

FIG. 5A illustrates the virtual environment 200 of FIGS. 2A through 4H, with a ray 424 traced from an origin point 426 associated with the intersected object component 408 of FIG. 4A. In the example of FIG. 5A, the ray 424 is traced from the origin point 426 to determine visual characteristics of the intersected object component 408, such as shadow characteristics for accurately depicting the intersected object component 408 with a display pixel (e.g., a display pixel that corresponds to a pixel of the image plane 404 through which ray 406 was traced). In this regard, the ray 424 is traced from the origin point 426 toward the virtual light source 214 within the virtual environment 200. One will appreciate, in view of the present disclosure, that a ray may be traced from the origin point 426 along other ray paths (e.g., to mimic specular reflection).

FIG. 5A illustrates an intersected object component 428 of virtual object 210 (e.g., a table) that the ray 424 intersects with. Ray trace spatial coherence data 430 based upon the ray trace operation associated with ray 424 may be utilized neighboring adjacent ray traces (e.g., for rays traced from spatially proximate origin points). The ray trace spatial coherence data 430 may be implemented in various forms, such as the intersected object component 428, a set of object components proximate to or including the intersected object component 428, a set of node(s) of an acceleration structure that encompasses the intersected object component 428, etc.

Figure 5B:
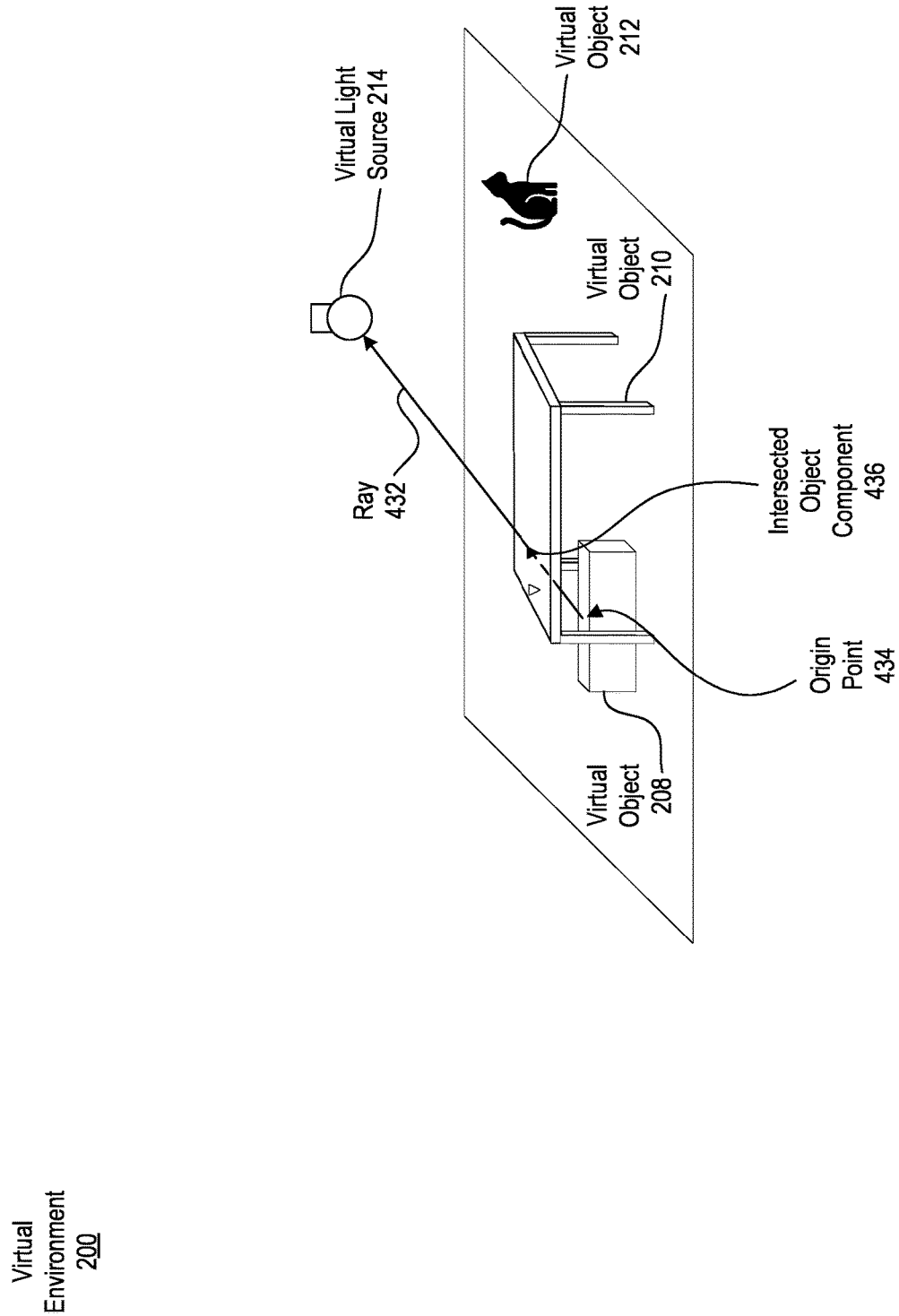
FIG. 5B illustrates a conceptual representation of an example ray trace operation that is spatially proximate to the ray trace operation of FIG. 5A and that uses ray trace spatial coherence data associated with the ray trace operation of FIG. 5A to determine an intersected object component.

FIG. 5B illustrates a spatially proximate ray trace operation in which a ray 432 is cast from an origin point 434 that is spatially proximate to the origin point 426 of FIG. 5A. In the example of FIG. 5B, the ray trace spatial coherence data 430 from the ray trace operation associated with ray 424 (FIG. 5A) is utilized to determine that the ray 432 intersects with intersected object component 436 of the virtual object 210 (e.g., the table). The intersected object component 436 can indicate that the origin point 434 is within the shadow of the intersected object component 436 (or otherwise blocked from direct incidence of light from the virtual light source 214). In some instances, such a determination is sufficient to indicate shadow properties of the origin point 434 (and the object component associated therewith). In some instances, such as where the origin point 434 is associated with a surface that causes specular reflection, additional ray trace operations may be performed to determine whether a ray from the origin point 434 intersects with a closer object component, which would affect reflection characteristics of the origin point 434.

Figure 5C:
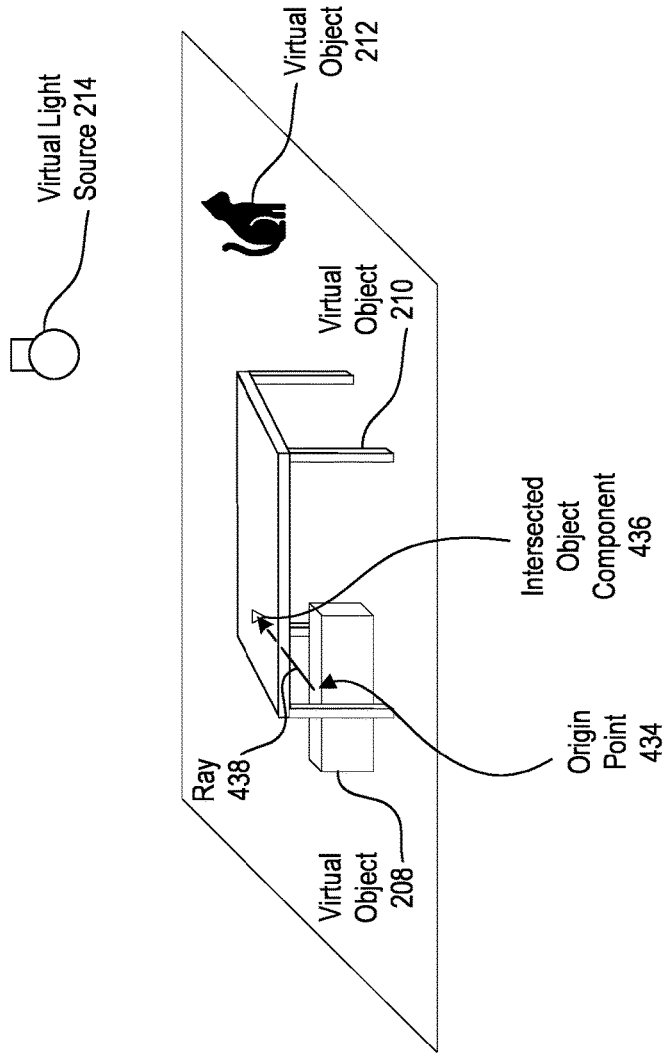
FIG. 5C illustrates a conceptual representation of a shortened ray based upon the intersected object component of FIG. 5B.

FIG. 5C illustrates a shortened ray 438 based upon the ray 432 (from FIG. 5B) that extends from the origin point 434 to the intersected object component 436. A system may test the shortened ray 438 against one or more object components and/or acceleration structures to determine whether the ray 438 intersects with an object component that is closer to the origin point 434 than the intersected object component 436. The system may thus advantageously refrain from testing the ray 438 against object components positioned between the intersected object component 436 and the virtual light source 214 within the virtual environment 200.

As noted above, in some implementations, ray trace spatial coherence data may be utilized in conjunction with ray trace temporal coherence data to facilitate computationally efficient ray tracing operations. For example, FIG. 6 illustrates a conceptual representation of a ray trace scheme that utilizes ray trace temporal coherence data and/or ray trace spatial coherence data. FIG. 6 illustrates a conceptual representation of an image plane that includes various pixels (depicted as black or white squares) through which rays may be cast for generating a representation of a virtual environment. In one example, a first subset of ray trace operations is performed by tracing rays from an origin point through the black pixels and into a virtual environment. If available, ray trace temporal coherence data may be utilized to determine the object components intersected by rays of the first subset of ray trace operations. A second subset of ray trace operations may then be performed by tracing rays from an origin point through the white pixels and into the virtual environment. The second subset of ray trace operations may utilize ray trace spatial coherence data based upon the first subset of ray trace operations (and/or ray trace temporal coherence data if available). For example, each ray trace operation of the second subset of ray trace operations (e.g., for a white pixel) may utilize ray trace spatial coherence data from one or more ray trace operations of one or more of its four neighboring pixels (e.g., neighboring black pixels).

Although the example of FIG. 6 comprises a checkerboard pattern with different subsets of ray trace operations being associated with portions of the checkerboard pattern, other structured approaches for dividing rays trace operations into different subsets may be utilized in accordance with the present disclosure.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
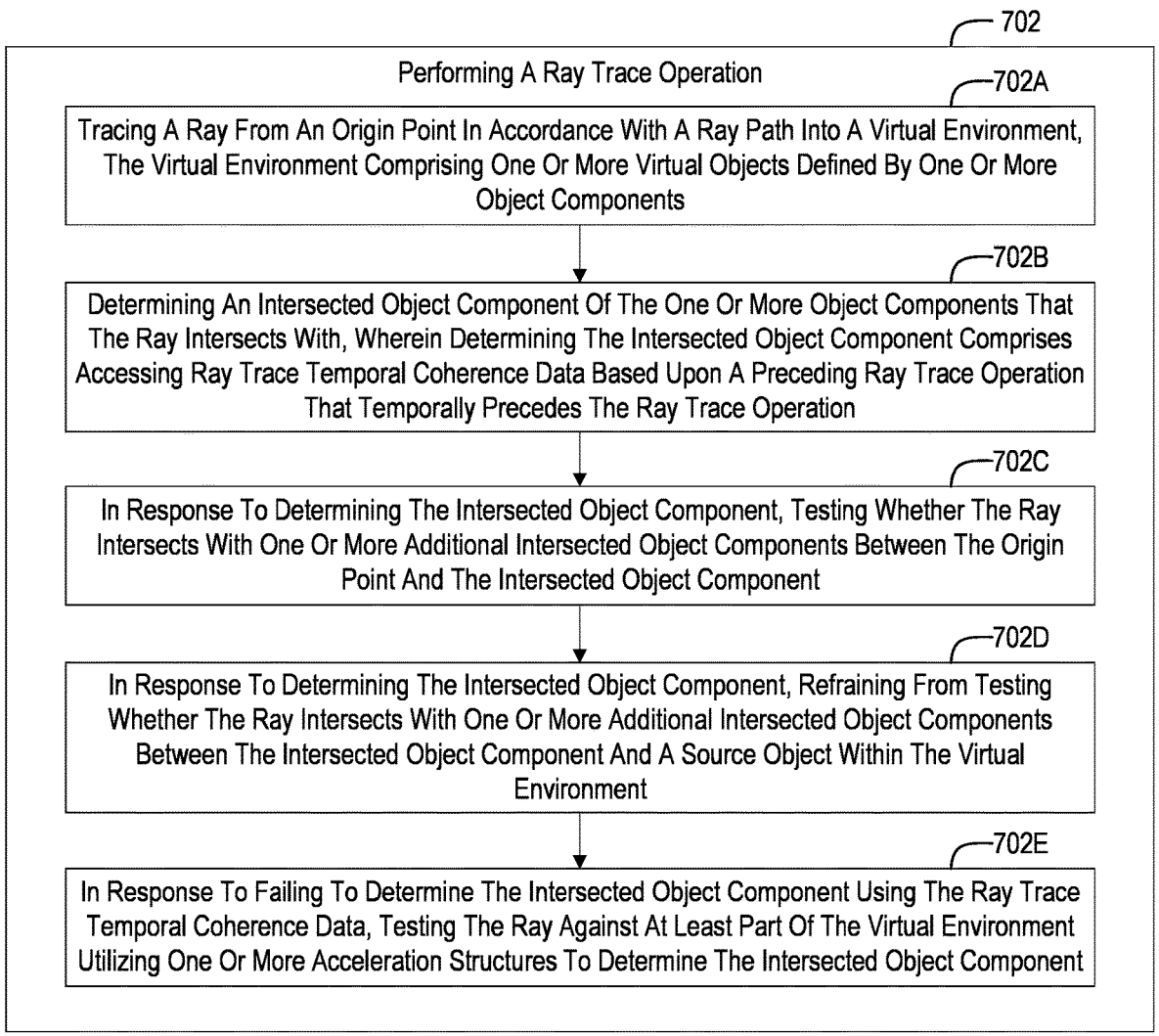
FIG. 7 illustrates an example flow diagram depicting acts associated with performing a ray trace operation using ray trace temporal coherence data.

FIG. 7 illustrates an example flow diagram 700 depicting acts associated with performing a ray trace operation using ray trace temporal coherence data.

Act 702 of flow diagram 700 includes performing a ray trace operation. Act 702A of act 702 includes tracing a ray from an origin point in accordance with a ray path into a virtual environment, the virtual environment comprising one or more virtual objects defined by one or more object components. Act 702B of act 702 includes determining an intersected object component of the one or more object components that the ray intersects with, wherein determining the intersected object component comprises accessing ray trace temporal coherence data based upon a preceding ray trace operation that temporally precedes the ray trace operation.

In some implementations, the ray trace temporal coherence data comprises a preceding intersected object component of the one or more object components that a preceding ray of the preceding ray trace operation was determined to intersect with. In some instances, determining the intersected object component comprises testing whether the ray intersects with the preceding intersected object component.

In some implementations, the ray trace temporal coherence data comprises a set of neighboring object components of the one or more object components. The set of neighboring object components may comprise a preceding intersected object component of the one or more object components that a preceding ray of the preceding ray trace operation was determined to intersect with. In some instances, determining the intersected object component comprises testing whether the ray intersects with at least some of the set of neighboring object components.

In some implementations, the ray trace temporal coherence data comprises one or more nodes of an acceleration structure that encompasses a preceding intersected object component of the one or more object components that a preceding ray of the preceding ray trace operation was determined to intersect with. In some instances, determining the intersected object component comprises: testing whether the ray intersects with any of the one or more nodes, and, in response to determining that the ray intersects with a particular node of the one or more nodes, testing whether the ray intersects with (i) any child nodes of the particular node or (ii) any object components of the one or more object components encompassed by the particular node.

In some implementations, the ray trace temporal coherence data comprises a plurality of object components of a virtual object of the one or more virtual objects that comprises a preceding intersected object component of the one or more object components that a preceding ray of the preceding ray trace operation was determined to intersect with. In some instances, determining the intersected object component comprises testing whether the ray intersects with at least some of the plurality of object components.

In some implementations, the ray trace temporal coherence data is selected based upon one or more motion vectors associated with at least one virtual object or at least one object component within the virtual environment. In some instances, the ray trace temporal coherence data is selected based upon one or more motion vectors associated with the origin point.

Act 702C of act 702 includes, in response to determining the intersected object component, testing whether the ray intersects with one or more additional intersected object components between the origin point and the intersected object component. In some implementations, testing whether the ray intersects with the one or more additional intersected object components comprises: determining a set of candidate virtual objects based upon motion attributes of one or more virtual objects within the virtual environment, and determining whether the ray intersects with object components of the set of candidate virtual objects.

Act 702D of act 702 includes, in response to determining the intersected object component, refraining from testing whether the ray intersects with one or more additional intersected object components between the intersected object component and a source object within the virtual environment.

Act 702E of act 702 includes, in response to failing to determine the intersected object component using the ray trace temporal coherence data, testing the ray against at least part of the virtual environment utilizing one or more acceleration structures to determine the intersected object component. In some implementations, testing the ray against at least the part of the virtual environment utilizing the one or more acceleration structures comprises refraining from testing the ray against components of at least the virtual environment or the one or more acceleration structures against which the ray was tested based upon the ray trace temporal coherence data.

Figure 8:
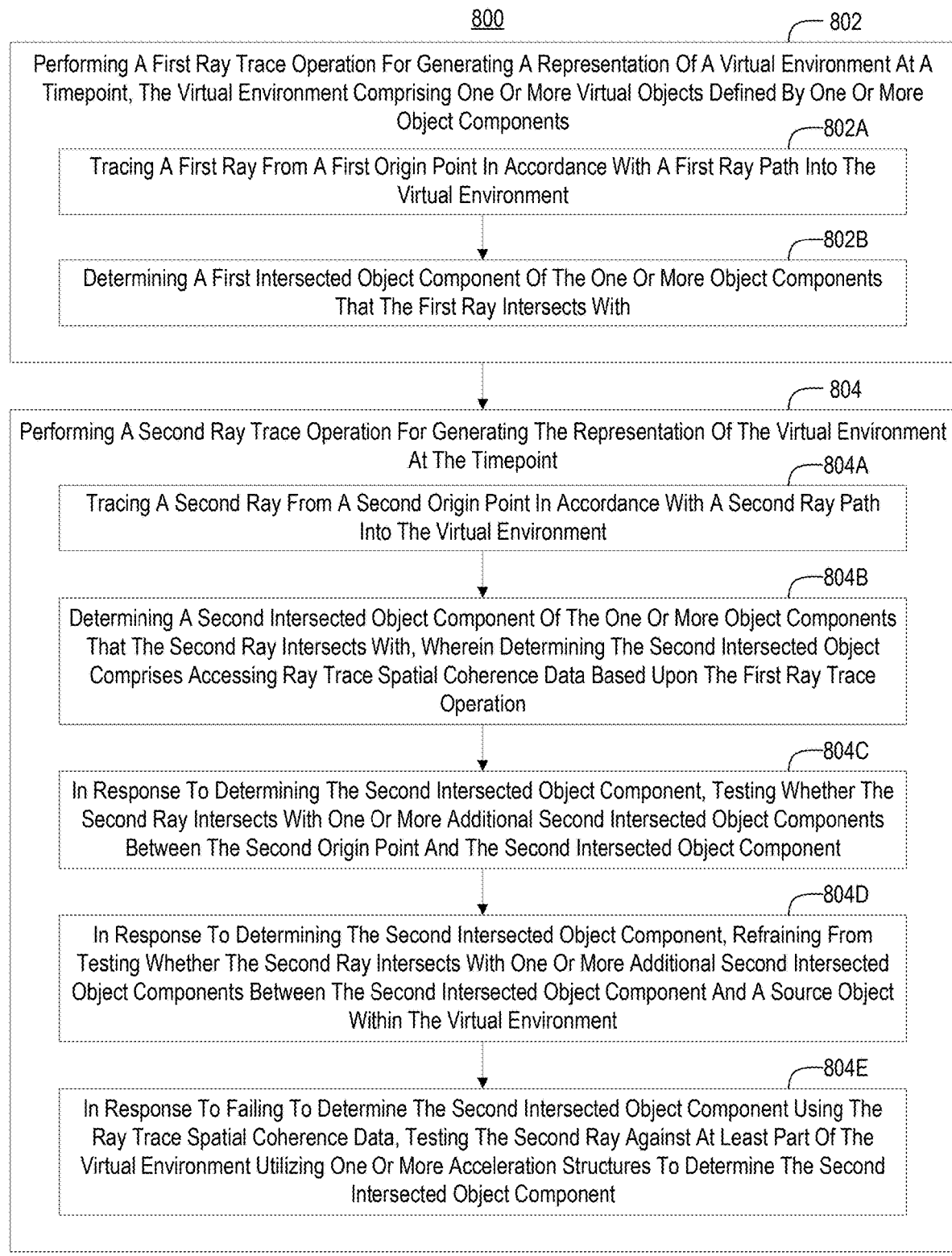
FIG. 8 illustrates an example flow diagram depicting acts associated with performing a ray trace operation using ray trace spatial coherence data.

FIG. 8 illustrates an example flow diagram 800 depicting acts associated with performing a ray trace operation using ray trace spatial coherence data.

Act 802 of flow diagram 800 includes performing a first ray trace operation for generating a representation of a virtual environment at a timepoint, the virtual environment comprising one or more virtual objects defined by one or more object components. Act 802A of act 802 includes tracing a first ray from a first origin point in accordance with a first ray path into the virtual environment. Act 802B of act 802 includes determining a first intersected object component of the one or more object components that the first ray intersects with. In some implementations, determining the first intersected object component comprises accessing ray trace temporal coherence data based upon a preceding ray trace operation that temporally precedes the first ray trace operation.

Act 804 of flow diagram 800 includes performing a second ray trace operation for generating the representation of the virtual environment at the timepoint. Act 804A of act 804 includes tracing a second ray from a second origin point in accordance with a second ray path into the virtual environment. In some implementations, the first origin point and the second origin point comprise a same origin point. Act 804B of act 804 includes determining a second intersected object component of the one or more object components that the second ray intersects with, wherein determining the second intersected object comprises accessing ray trace spatial coherence data based upon the first ray trace operation.

In some implementations, the ray trace spatial coherence data comprises the first intersected object component. In some instances, determining the second intersected object component comprises testing whether the second ray intersects with the first intersected object component.

In some implementations, the ray trace spatial coherence data comprises a set of neighboring object components of the one or more object components. The set of neighboring object components may comprise the first intersected object component. In some instances, determining the second intersected object component comprises testing whether the ray intersects with at least some of the set of neighboring object components.

In some implementations, the ray trace spatial coherence data comprises one or more nodes of an acceleration structure that encompasses the first intersected object component. In some instances, wherein determining the second intersected object component comprises: testing whether the second ray intersects with any of the one or more nodes, and in response to determining that the second ray intersects with a particular node of the one or more nodes, testing whether the second ray intersects with (i) any child nodes of the particular node or (ii) any object components of the one or more object components encompassed by the particular node.

In some implementations, the ray trace spatial coherence data comprises a plurality of object components of a virtual object of the one or more virtual objects that comprises the first intersected object component. In some instances, determining the second intersected object component comprises testing whether the second ray intersects with at least some of the plurality of object components.

In some implementations, the ray trace spatial coherence data is further based upon one or more additional ray trace operations for generating the representation of the virtual environment at the timepoint. In some instances, determining the second intersected object component further comprises accessing ray trace temporal coherence data based upon a preceding ray trace operation that temporally precedes the second ray trace operation.

Act 804C of act 804 includes, in response to determining the second intersected object component, testing whether the second ray intersects with one or more additional second intersected object components between the second origin point and the second intersected object component. In some implementations, testing whether the second ray intersects with the one or more additional second intersected object components comprises: determining a set of candidate virtual objects based upon motion attributes of one or more virtual objects within the virtual environment, and determining whether the second ray intersects with object components of the set of candidate virtual objects.

Act 804D of act 804 includes, in response to determining the second intersected object component, refraining from testing whether the second ray intersects with one or more additional second intersected object components between the second intersected object component and a source object within the virtual environment.

Act 804E of act 804 includes, in response to failing to determine the second intersected object component using the ray trace spatial coherence data, testing the second ray against at least part of the virtual environment utilizing one or more acceleration structures to determine the second intersected object component. In some implementations, testing the second ray against at least the part of the virtual environment utilizing the one or more acceleration structures comprises refraining from testing the second ray against components of at least the virtual environment or the one or more acceleration structures against which the second ray was tested based upon the ray trace spatial coherence data.

Additional Details Related to Computing Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

I claim:

1. A system for performing ray trace operations based upon temporal coherence data, comprising:
   one or more processors; and
   one or more hardware storage devices that store instructions that are executable by the one or more processors to configure the system to:
      perform a ray trace operation, comprising:
         tracing a ray from an origin point in accordance with a ray path into a virtual environment, the virtual environment comprising one or more virtual objects defined by one or more object components; and
         determining an intersected object component of the one or more object components that the ray intersects with, wherein determining the intersected object component utilizes ray trace temporal coherence data based upon a preceding ray trace operation that temporally precedes the ray trace operation, wherein determining the intersected object component of the one or more object components comprises:
            testing whether the ray intersects with a preceding intersected object component of the one or more object components that a preceding ray of the preceding ray trace operation was determined to intersect with; and
            after determining that the ray does not intersect with the preceding intersected object component, testing whether the ray intersects with at least one neighboring object component of a set of neighboring object components, wherein the set of neighboring object components is based on the preceding intersected object component.

2. The system of claim 1, wherein determining the intersected object component further comprises:
   after determining that the ray does not intersect with at least one neighboring object component of the set of neighboring object components, testing whether the ray intersects with any of one or more nodes of an acceleration structure, wherein the one or more nodes encompass the preceding intersected object component; and
   after determining that the ray intersects with a particular node of the one or more nodes, testing whether the ray intersects with (i) any child nodes of the particular node or (ii) any object components of the one or more object components encompassed by the particular node.

3. The system of claim 2, wherein determining the intersected object component further comprises, after determining that the ray does not intersect with any of the one or more nodes, testing whether the ray intersects with a plurality of object components of a virtual object of the one or more virtual objects that includes the preceding intersected object component.

4. The system of claim 1, wherein the ray trace temporal coherence data is selected based upon one or more motion vectors associated with the origin point, a virtual camera, at least one virtual object, or at least one object component within the virtual environment.

5. The system of claim 1, wherein the ray trace operation further comprises, in response to determining the intersected object component, testing whether the ray intersects with one or more additional intersected object components between the origin point and the intersected object component.

6. The system of claim 5, wherein testing whether the ray intersects with the one or more additional intersected object components comprises:
determining a set of candidate virtual objects based upon motion attributes of one or more virtual objects or a virtual camera within the virtual environment; and
determining whether the ray intersects with object components of the set of candidate virtual objects.

7. The system of claim 1, wherein the ray trace operation further comprises:
in response to determining the intersected object component, refraining from testing whether the ray intersects with one or more additional intersected object components between the intersected object component and a source object within the virtual environment.

8. The system of claim 1, wherein the ray trace operation further comprises, in response to failing to determine the intersected object component using the ray trace temporal coherence data, testing the ray against at least part of the virtual environment utilizing one or more acceleration structures to determine the intersected object component, and wherein testing the ray against at least the part of the virtual environment utilizing the one or more acceleration structures comprises refraining from testing the ray against components of at least the virtual environment or the one or more acceleration structures against which the ray was tested based upon the ray trace temporal coherence data.

9. A method for performing ray trace operations based upon temporal coherence data, comprising:
performing a ray trace operation, comprising:
tracing a ray from an origin point in accordance with a ray path into a virtual environment, the virtual environment comprising one or more virtual objects defined by one or more object components; and
determining an intersected object component of the one or more object components that the ray intersects with, wherein determining the intersected object component utilizes ray trace temporal coherence data based upon a preceding ray trace operation that temporally precedes the ray trace operation, wherein determining the intersected object component of the one or more object components comprises:
testing whether the ray intersects with a preceding intersected object component of the one or more object components that a preceding ray of the preceding ray trace operation was determined to intersect with; and
after determining that the ray does not intersect with the preceding intersected object component, testing whether the ray intersects with at least one neighboring object component of a set of neighboring object components, wherein the set of neighboring object components is based on the preceding intersected object component.

* * * * *